United States Patent
Nobayashi

(10) Patent No.: US 10,306,132 B2
(45) Date of Patent: May 28, 2019

(54) DISTANCE CALCULATION APPARATUS, IMAGING APPARATUS AND DISTANCE CALCULATION METHOD THAT INCLUDE CONFIDENCE CALCULATION OF DISTANCE INFORMATION

(71) Applicant: CANON KABUSHIKI KAISHA, Tokyo (JP)

(72) Inventor: Kazuya Nobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 15/144,853

(22) Filed: May 3, 2016

(65) Prior Publication Data

US 2016/0337576 A1    Nov. 17, 2016

(30) Foreign Application Priority Data

May 11, 2015  (JP) .................................. 2015-096658
Feb. 4, 2016  (JP) .................................. 2016-019813

(51) Int. Cl.
| | |
|---|---|
| H04N 5/232 | (2006.01) |
| G01C 3/32 | (2006.01) |
| H04N 5/369 | (2011.01) |
| H04N 5/3745 | (2011.01) |
| G06T 7/00 | (2017.01) |
| G06T 7/70 | (2017.01) |

(52) U.S. Cl.
CPC .......... *H04N 5/23212* (2013.01); *G01C 3/32* (2013.01); *G06T 7/70* (2017.01); *G06T 7/97* (2017.01); *H04N 5/3696* (2013.01); *H04N 5/3745* (2013.01)

(58) Field of Classification Search
CPC ............. H04N 5/23212; H04N 5/3696; H04N 5/3745; G01C 3/32; G06T 7/70; G06T 7/97
USPC ....................................... 348/222.1
See application file for complete search history.

(56) References Cited

U.S. PATENT DOCUMENTS

| | | | |
|---|---|---|---|
| 9,294,668 B2 | 3/2016 | Nobayashi | |
| 9,307,140 B2 | 4/2016 | Nobayashi | |
| 2010/0013947 A1* | 1/2010 | Oikawa ................. | G03B 13/36 348/222.1 |

(Continued)

FOREIGN PATENT DOCUMENTS

| | | |
|---|---|---|
| JP | 3855812 B2 | 12/2006 |
| JP | 5066851 B2 | 11/2012 |

*Primary Examiner* — Lin Ye
*Assistant Examiner* — Chan T Nguyen
(74) *Attorney, Agent, or Firm* — Venable LLP

(57) ABSTRACT

A distance calculation apparatus calculates distance information based on a first image, which is generated based on luminous flux that passed through a first pupil region, and a second image, which is generated based on luminous flux that passed through a second pupil region. The distance calculation apparatus includes a distance calculation unit to calculate the distance information by comparing a local region of the first image and a local region of the second image and a confidence calculation unit to calculate confidence of the distance information based on a contrast evaluation value, which is a value indicating a magnitude of a contrast change amount in the local region of the first image, in the local region of the second image, or in a local region of a composite image of the first image and the second image.

13 Claims, 15 Drawing Sheets

(56) References Cited

U.S. PATENT DOCUMENTS

| | | | | |
|---|---|---|---|---|
| 2012/0229696 A1* | 9/2012 | Hashimoto | ............... | G02B 7/36 |
| | | | | 348/360 |
| 2012/0300116 A1* | 11/2012 | Nakamoto | ......... | H04N 5/23212 |
| | | | | 348/349 |
| 2013/0293704 A1* | 11/2013 | Imamura | .................. | G01C 3/08 |
| | | | | 348/135 |
| 2014/0063234 A1* | 3/2014 | Nobayashi | ............. | G02B 7/346 |
| | | | | 348/135 |
| 2014/0139724 A1* | 5/2014 | Yasuda | .............. | H04N 5/23212 |
| | | | | 348/349 |
| 2015/0241205 A1 | 8/2015 | Nobayashi | | |
| 2016/0182843 A1* | 6/2016 | Endo | ...................... | H04N 5/217 |
| | | | | 348/294 |
| 2016/0327771 A1* | 11/2016 | Inoue | ...................... | G02B 7/34 |

* cited by examiner

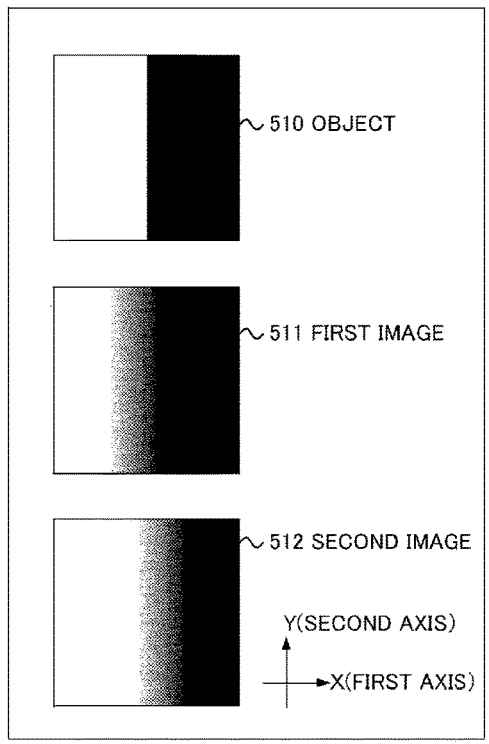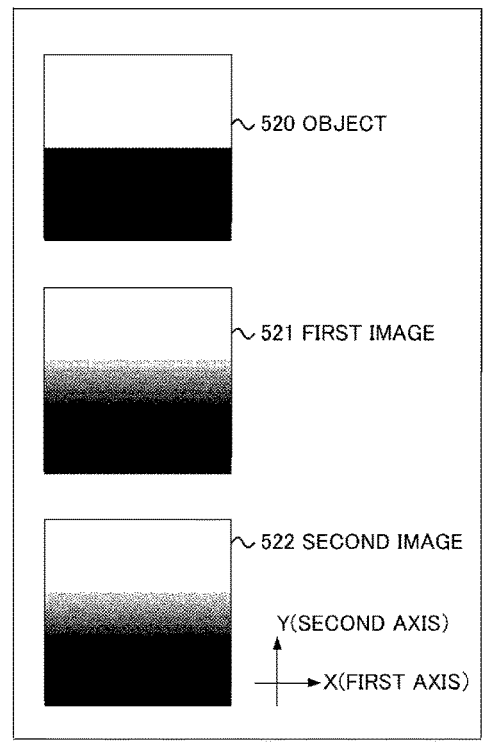
FIG. 5A
FIG. 5C
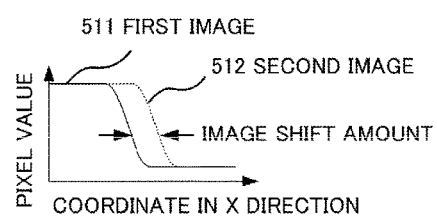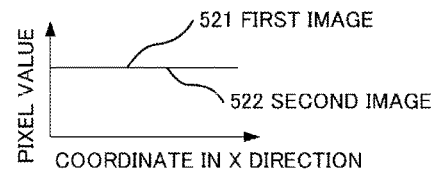
FIG. 5B
FIG. 5D

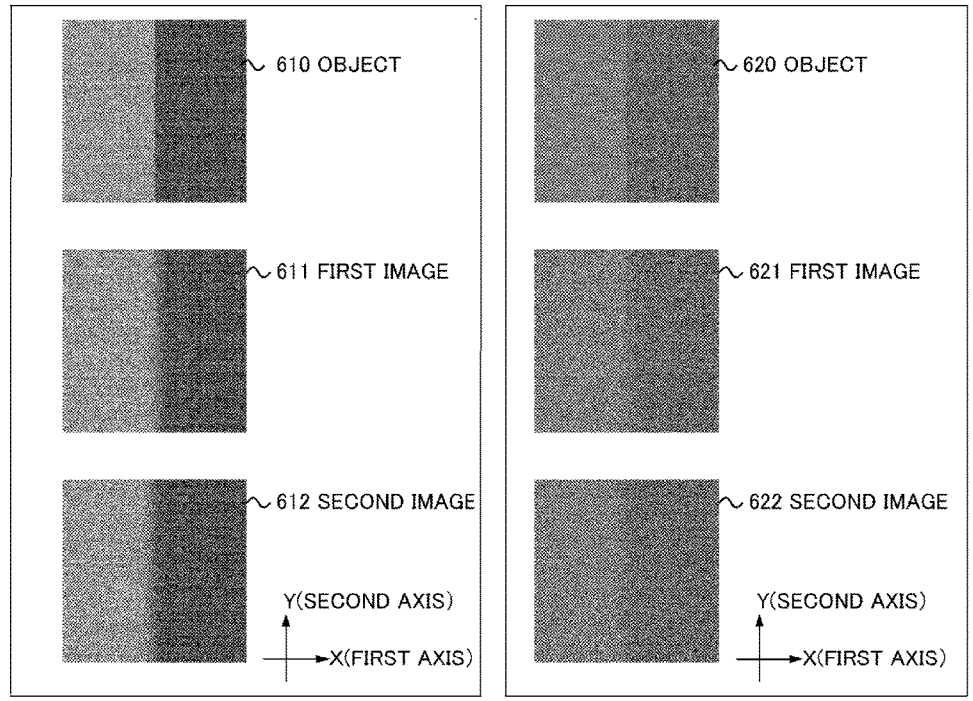
FIG. 6A
FIG. 6B
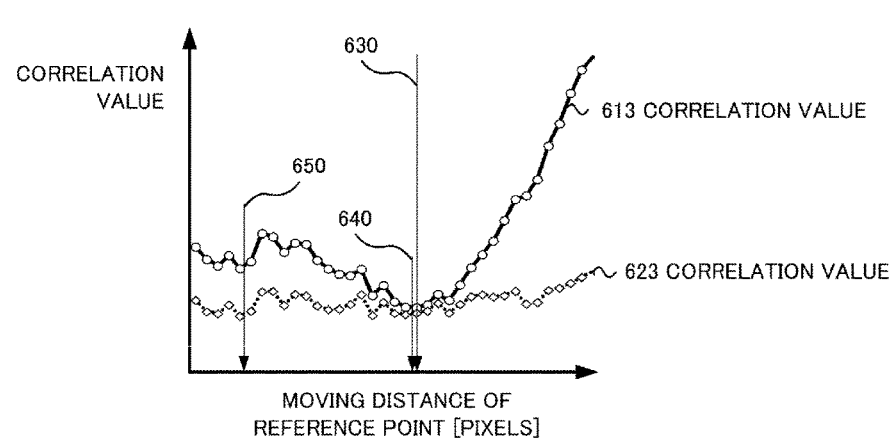
FIG. 6C

DISTANCE CALCULATION APPARATUS, IMAGING APPARATUS AND DISTANCE CALCULATION METHOD THAT INCLUDE CONFIDENCE CALCULATION OF DISTANCE INFORMATION

CLAIM TO PRIORITY

This application claims the benefit of Japanese Patent Applications No. 2015-096658, filed on May 11, 2015, and No. 2016-019813, filed on Feb. 4, 2016, which are hereby incorporated by reference herein in their entirety.

BACKGROUND OF THE INVENTION

Field of the Invention

The present invention relates to a distance calculation apparatus that calculates distance information based on images.

Description of the Related Art

In digital still cameras and digital video cameras, a technique of detecting distance information using a phase difference method is known, where pixels for distance measurement (also referred to as "distance measurement pixels" herein below) are disposed in a part or in all of the pixels of an image sensor.

According to this method, a plurality of photoelectric conversion units are disposed in a distance measurement pixel so that luminous flux, which passed through different regions on a pupil of a photographing lens, is guided to different photoelectric conversion units. Optical images generated by the luminous flux that passed through different pupil regions (hereafter called "image A" and "image B") can be acquired by signals output by the photoelectric conversion units included in each distance measurement pixel, and a plurality of images can be acquired based on image A and image B respectively. The pupil region corresponding to image A and the pupil region corresponding to image B are decentered in different directions from each other along a so-called "pupil dividing direction" axis.

A relative positional shift according to the defocus amount is generated between the plurality of acquired images (hereafter called "image A" and "image B") along the pupil dividing direction. This positional shift is called an "image shift", and the amount of the image shift is called an "image shift amount". A distance to the object can be calculated by converting the image shift amount into the defocus amount using a predetermined conversion coefficient. If such a method is used, highly accurate distance measurement can be performed at high-speed, since there is no need to move the lenses to measure the distance, unlike a conventional contrast method.

To calculate the image shift amount, a region-based corresponding points search technique, called "template matching", is normally used. In template matching, one of image A and image B is used as a standard image, and the other image is used as a reference image. Further, a local region centering around a point of interest (hereafter referred to as "collation region") is set on the standard image, and a collation region centering around a reference point, which corresponds to the point of interest, is set on the reference image. Then while sequentially moving the reference point, a point where the correlation (similarity) of image A and image B is highest is searched within the collation region. The image shift amount is calculated based on the relative positional shift amount between this point and the point of interest.

A problem that may occur in the case of calculating the image shift amount using template matching is that calculation errors in the image shift amount increase because of a contrast of the images. For example, if the contrast of the images is low, the change of similarity decreases, therefore corresponding points cannot be correctly calculated, and calculation errors in the image shift amount may increase.

To solve this problem, an apparatus disclosed in Japanese Patent No. 3855812 calculates a distance to an object based on stereo images, and generates a distribution indicating the confidence of calculated distances. If there is a region in which confidence is low, photographing conditions are set again so that the confidence improves, and distance is calculated again.

According to an apparatus disclosed in Japanese Patent No. 5066851, if there is a small region in which the defocus amount cannot be calculated, the defocus amount is interpolated for this region, so as to prevent a drop in distance measurement accuracy.

SUMMARY OF THE INVENTION

In both of the above mentioned prior arts, in some cases a desired effect may not be demonstrated depending on the conditions of the object.

For example, in the case of the apparatus disclosed in Japanese Patent No. 3855812, confidence of the distance may be calculated incorrectly when the contrast changes only in a specific axis direction in the images. This is because the contrast change amount is calculated based only on the variance values of the images included in the collation region, without considering the pupil dividing direction.

In the case of the apparatus disclosed in Japanese Patent No. 5066851, the slope, which indicates the changes amount of the difference between the images, is used, hence noise resistance is low, and a determination error may occur when noise is high in the images.

In other words, the prior arts have problems in terms of improving the distance measurement accuracy.

With the foregoing in view, it is an object of the present invention to provide a technique to improve accuracy of confidence for a distance measurement apparatus that calculates confidence in addition to the distance information.

The present invention in one aspect provides a distance calculation apparatus configured to calculate distance information based on a first image, which is generated based on luminous flux that passed through a first pupil region, and a second image, which is generated based on luminous flux that passed through a second pupil region, a center of gravity of the first pupil region and a center of gravity of the second pupil region being located at different positions along a first axis, the distance calculation apparatus comprising a distance calculation unit configured to calculate the distance information by comparing a local region of the first image and a local region of the second image; and a confidence calculation unit configured to calculate, for a plurality of times, a first value, which indicates a contrast change amount along the first axis, in a second axis direction crossing the first axis, in the local region of the first image, in the local region of the second image or in a local region of a composite image of the first image and the second image, and calculate confidence of the distance information based on a second value, which is a value representing the plurality of first values.

The present invention in another aspect provides a distance calculation apparatus configured to calculate distance information based on a first image, which is generated based on luminous flux that passed through a first pupil region, and a second image, which is generated based on luminous flux that passed through a second pupil region, the distance calculation apparatus comprising a distance calculation unit configured to calculate the distance information by comparing a local region of the first image and a local region of the second image, and a confidence calculation unit configured to calculate confidence of the distance information based on a ratio between a contrast evaluation value, which is a value indicating a magnitude of a contrast change amount in the local region of the first image, in the local region of the second image or in a local region of a composite image of the first image and the second image, and a noise amount estimation value which is calculated based on the first image, the second image or the composite image of the first image and the second image.

The present invention in another aspect provides a distance calculation apparatus configured to calculate distance information based on a plurality of images, which are generated based on luminous flux that passed through a plurality of pupil regions, comprising a generation unit configured to generate, out of the plurality of images, a set of two images for which centers of gravity of corresponding pupil regions are located at different positions along a first axis, a distance calculation unit configured to calculate the distance information by comparing the local regions which are set in the two images respectively, and a confidence calculation unit configured to calculate, for a plurality of times, a first value, which indicates a contrast change amount along the first axis, in a second axis direction crossing the first axis, in a local region of one of the two images, or in a local region of a composite image of the two images, and calculate confidence of the distance information based on a second value, which is a value representing the plurality of first values.

The present invention in still another aspect provides a distance calculation method executed by a distance calculation apparatus configured to calculate distance information based on a first image, which is generated based on luminous flux that passed through a first pupil region, and a second image, which is generated based on luminous flux that passed through a second pupil region, a center of gravity of the first pupil region and a center of gravity of the second pupil region being located at different positions along a first axis, the distance calculation method comprising the steps of calculating the distance information by comparing a local region of the first image and a local region of the second image, and calculating, for a plurality of times, a first value, which indicates a contrast change amount along the first axis, in a second axis direction crossing the first axis, in the local region of the first image, in the local region of the second image or in a local region of a composite image of the first image and the second image, and calculating confidence of the distance information based on a second value, which is a value representing the plurality of first values.

The present invention in yet still another aspect provides a distance calculation method executed by a distance calculation apparatus configured to calculate distance information based on a first image, which is generated based on luminous flux that passed through a first pupil region, and a second image, which is generated based on luminous flux that passed through a second pupil region, the distance calculation method comprising the steps of calculating the distance information by comparing a local region of the first image and a local region of the second image, and calculating confidence of the distance information based on a ratio between a contrast evaluation value, which is a value indicating a magnitude of a contrast change amount in the local region of the first image, in the local region of the second image or in a local region of a composite image of the first image and the second image, and a noise amount estimation value, which is calculated based on the first image, the second image or the composite image of the first image and the second image.

The present invention in yet still another aspect provides a distance calculation method executed by a distance calculation apparatus configured to calculate distance information based on a plurality of images, which are generated based on luminous flux that passed through a plurality of pupil regions, the distance calculation method comprising the steps of generating, out of the plurality of images, a set of two images for which centers of gravity of corresponding pupil regions are located at different positions along a first axis, calculating the distance information by comparing the local regions which are set in the two images respectively, and calculating, for a plurality of times, a first value, which indicates a contrast change amount along the first axis, in a second axis direction crossing the first axis, in a local region of one of the two images, or in a local region of a composite image of the two images, and calculating confidence of the distance information based on a second value, which is a value representing the plurality of first values.

The present invention in its another aspect provides a non-transitory storage medium recording a computer program for causing a distance calculation apparatus, configured to calculate distance information based on a first image, which is generated based on luminous flux that passed through a first pupil region, and a second image, which is generated based on luminous flux that passed through a second pupil region, to execute the steps of calculating the distance information by comparing a local region of the first image and a local region of the second image, and calculating, for a plurality of times, a first value, which indicates a contrast change amount along the first axis, in a second axis direction crossing the first axis, in the local region of the first image, in the local region of the second image or in a local region of a composite image of the first image and the second image, and calculating confidence of the distance information based on a second value, which is a value representing the plurality of first values, wherein a center of gravity of the first pupil region and a center of gravity of the second pupil region are located at different positions along a first axis.

The present invention in yet still another aspect provides a non-transitory storage medium recording a computer program for causing a distance calculation apparatus, configured to calculate distance information based on a first image, which is generated based on luminous flux that passed through a first pupil region, and a second image, which is generated based on luminous flux that passed through a second pupil region, to execute the steps of calculating the distance information by comparing a local region of the first image and a local region of the second image, and calculating confidence of the distance information based on a ratio between a contrast evaluation value, which is a value indicating a magnitude of a contrast change amount in the local region of the first image, in the local region of the second image or in a local region of a composite image of the first image and the second image, and a noise amount estimation value, which is calculated based on the first image, the second image or the composite image of the first image and the second image.

The present invention in yet still another aspect provides a non-transitory storage medium recording a computer program for causing a distance calculation apparatus, configured to calculate distance information based on a plurality of images, which are generated based on luminous flux that passed through a plurality of pupil regions, to execute the steps of generating, out of the plurality of images, a set of two images for which centers of gravity of corresponding pupil regions are located at different positions along a first axis, calculating the distance information by comparing the local regions which are set in the two images respectively and calculating, for a plurality of times, a first value, which indicates a contrast change amount along the first axis, in a second axis direction crossing the first axis, in a local region of one of the two images, or in a local region of a composite image of the two images, and calculating confidence of the distance information based on a second value, which is a value representing the plurality of first values.

According to the present invention, accuracy of confidence can be improved in a distance calculation apparatus that calculates confidence in addition to the distance information.

Further features of the present invention will become apparent from the following description of exemplary embodiments with reference to the attached drawings.

BRIEF DESCRIPTION OF THE DRAWINGS

FIG. 5A to FIG. 5D are first diagrams depicting a contrast change and an image shift amount.

FIG. 6A to FIG. 6C are second diagrams depicting a contrast change and an image shift amount.

DESCRIPTION OF THE EMBODIMENTS

Embodiment 1

Embodiment 1 of the present invention will now be described with reference to the drawings.

Embodiment 1 is an imaging apparatus (digital camera) equipped with a distance calculation apparatus according to the present invention, but the present invention is not limited to this. In the present invention, same composing elements are denoted with same reference symbols, where redundant description is omitted.

Figure 1A:
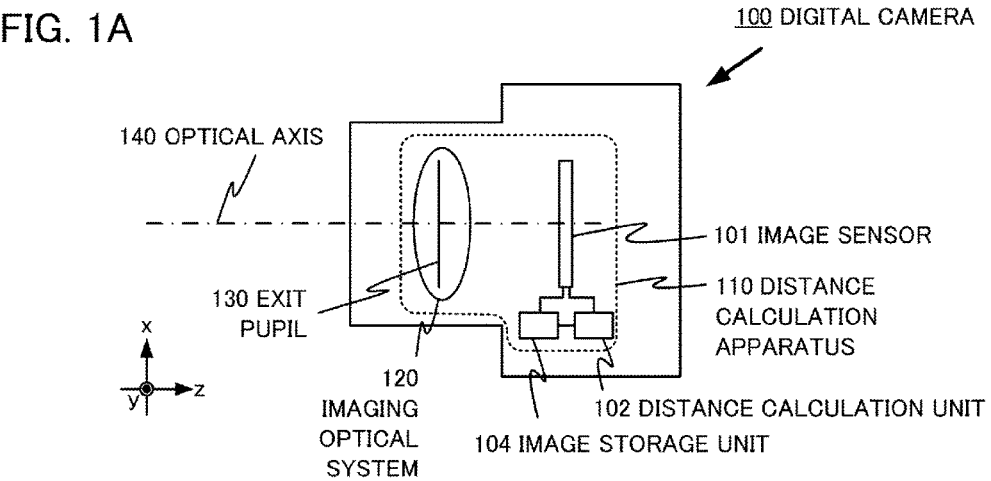
FIG. 1A to FIG. 1C are diagrams depicting configurations of a digital camera and an image sensor according to Embodiment 1.

FIG. 1A is a diagram depicting a configuration of a digital camera 100 according to Embodiment 1.

The digital camera 100 includes an imaging optical system 120, an image sensor 101, a distance calculation unit 102, an image storage unit 104, an image generation unit (not illustrated), and a lens driving control unit (not illustrated). Of these composing elements, the imaging optical system 120, the image sensor 101, the distance calculation unit 102 and the image storage unit 104 constitute a distance calculation apparatus 110.

The imaging optical system 120 is a photographing lens of the digital camera 100, and is a unit for forming an image of an object on the image sensor 101, which is an image detector plane. The imaging optical system 120 is constituted by a plurality of lens groups and a diaphragm, and forms an exit pupil 130 at a position distant from the image sensor 101 by a predetermined distance. The reference number 140 in FIG. 1A indicates an optical axis of the imaging optical system 120, and is an axis parallel with the Z axis in this embodiment. The X axis and the Y axis are perpendicular to each other and to the optical axis.

The image sensor 101 is constituted by a CMOS (Complementary Metal Oxide Semiconductor) or a CCD (Charge Coupled Device). An object image formed on the image sensor 101 by the imaging optical system 120 is converted into electric signals by the image sensor 101. The image sensor 101 will now be described in detail with reference to FIG. 1B.

Figure 1B:
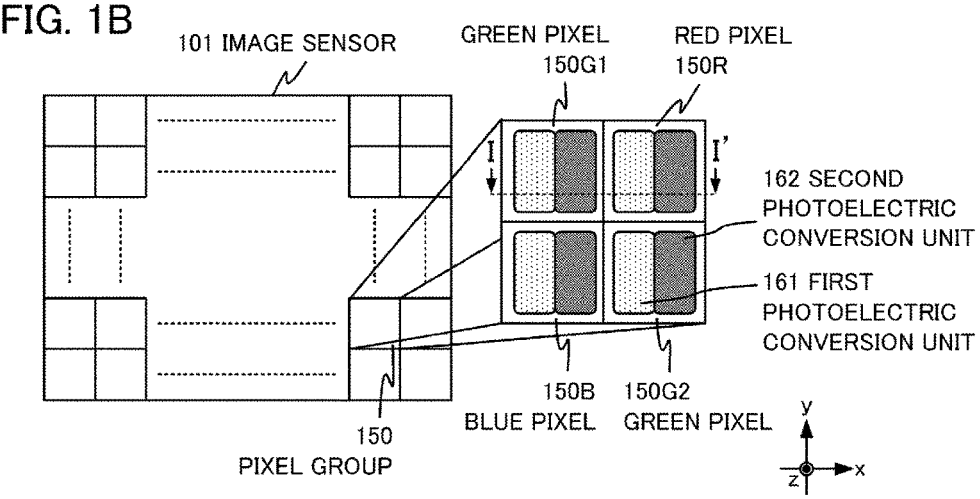

FIG. 1B is an X-Y cross-sectional view of the image sensor 101. In the image sensor 101, a plurality of pixel groups 150 (each pixel group consists of 2×2 pixels) are arrayed. In each pixel group 150, green pixels 150G1 and 150G2 are diagonally disposed, and a red pixel 150R and a blue pixel 150B are disposed in the other two pixels.

The green pixels 150G1 and 150G2, the red pixel 150R and the blue pixel 150B each has a plurality of photoelectric conversion units.

Figure 1C:
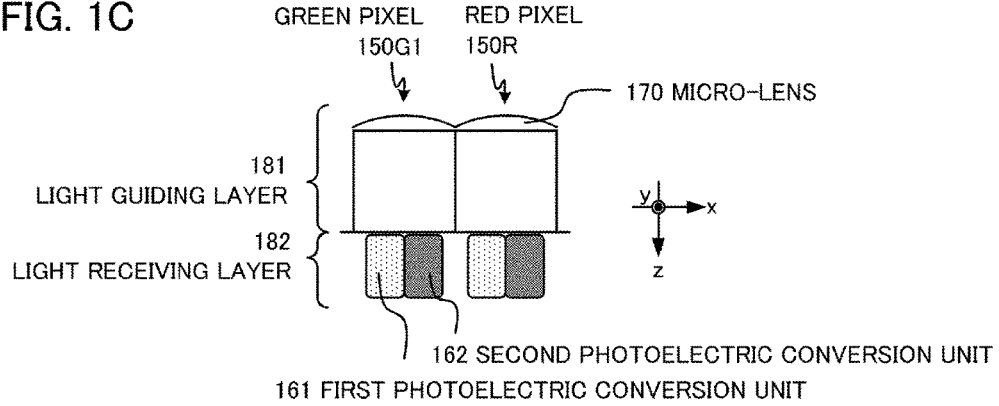

FIG. 1C is a schematic diagram of the I-I' cross-section of the pixel group 150. Each pixel is constituted by a light receiving layer 182 and a light guiding layer 181. In the light receiving layer 182, two photoelectric conversion units (first photoelectric conversion unit 161 and second photoelectric conversion unit 162), for converting received light into electric signals, are disposed. In the light guiding layer 181, on the other hand, a micro-lens 170 for efficiently guiding the luminous flux which entered the pixel to the photoelectric conversion unit, a color filter (not illustrated) which passes a light having a predetermined wavelength band, wires (not illustrated) for reading the image and driving the pixel and the like, are disposed.

In this embodiment, it is assumed that the image sensor 101 outputs digitally converted electric signals. Hereafter a set of digital signals corresponding to one image is simply referred to as an "image". The image is RAW format data, and is developed by an image generation unit (not illustrated) that is viewable by the user.

The distance calculation unit 102 is a unit for calculating distance information based on the image generated by the image generation unit. Detailed processing content will be described later. Distance information refers to information on the relative position of the object, such as a distance to the object (hereafter referred to as "focusing distance"), a defocus amount, and an image shift amount, and may also be called "depth information". The distance calculation unit 102 may be implemented by specially designed hardware or may be implemented by a software module. The distance calculation unit 102 may also be implemented by a field programmable gate array (FPGA), an application specific integrated circuit (ASIC) or the like, or may be implemented by a combination of these components.

If the above mentioned units are constructed by software, a program stored in an auxiliary storage device is loaded to the main storage device and the program is executed by the CPU, whereby each unit can function (CPU, auxiliary storage device and main storage device are not illustrated).

Figure 13:
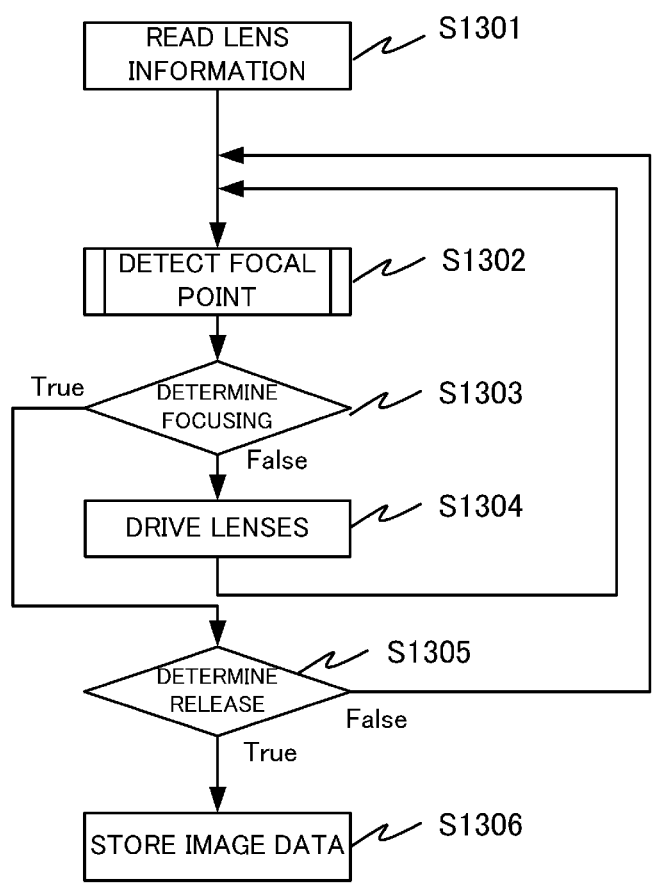
FIG. 13 is a processing flow chart of a digital camera according to an embodiment.

Now a processing when the digital camera 100 according to this embodiment photographs an image will be described with reference to the processing flow chart in FIG. 13. The processing in FIG. 13 is executed by a controller (not illustrated) while the shutter button of the digital camera 100 is being depressed (including half depression).

First, in step S1301, lens information (e.g. focal length, diaphragm stop) is read from the imaging optical system 120 and temporarily stored.

The steps S1302 to S1304 are processings to perform focusing on an object.

First, in step S1302, defocus amount and confidence of the calculated distance (hereafter referred to as "distance confidence") are calculated by the later mentioned distance calculation processing, based on the images output by the image sensor 101.

Then, in step S1303, it is determined whether the imaging optical system 120 is in the focused state or not, based on the calculated defocus amount and distance confidence. If the target object is not focused on, processing advances to step S1304 where the lens driving control unit is controlled based on the calculated defocus amount, and the imaging optical system 120 is driven to the focusing position.

If it is determined that the target object is focused on in step S1303, processing advances to step S1305, where it is determined whether the shutter was released (full depression). If it is determined that the shutter was not released, then processing returns to step S1302, and the above mentioned processing is repeated.

If it is determined that the shutter was released in step S1305, the image is acquired from the image sensor 101 and stored in the image storage unit 104.

The digital camera 100 according to this embodiment can generate an ornamental image by the image generation unit performing development processing on an image stored in the image storage unit 104. Further, if the distance calculation processing similar to that executed in step S1302 is performed on the image stored in the image storage unit 104, a distance image corresponding to the ornamental image and distribution of confidence corresponding to this distance image can be generated.

Now, a method for calculating a focusing distance based on images output by the image sensor 101 will be described.

Figure 2A:
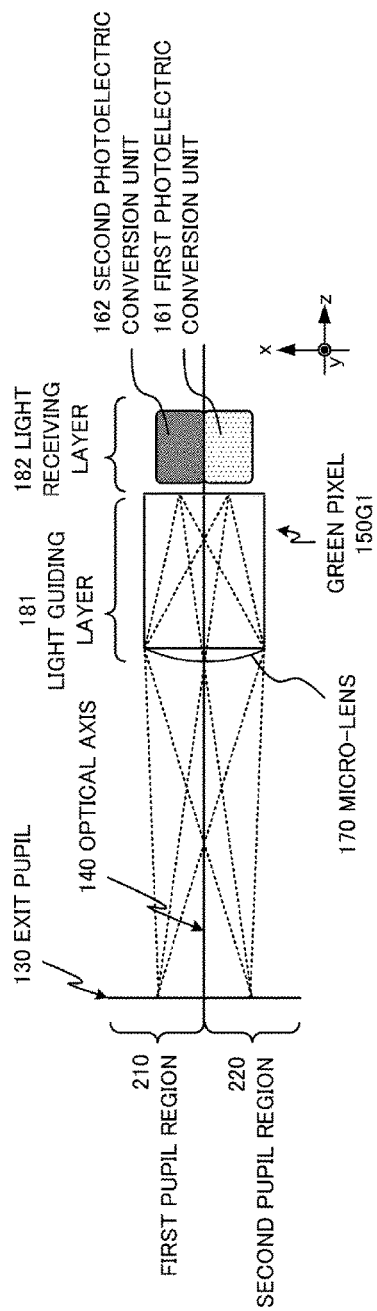
FIG. 2A and FIG. 2B are diagrams depicting the relationships between a photoelectric conversion unit and a pupil region and between an exit pupil and a pupil region.

FIG. 2A is a diagram depicting luminous flux received by the first photoelectric conversion unit 161 and the second photoelectric conversion unit 162 of the image sensor 101. FIG. 2A shows only the exit pupil 130 of the imaging optical system 120 and a representative pixel (green pixel 150G1) disposed in the image sensor 101.

Figure 2B:
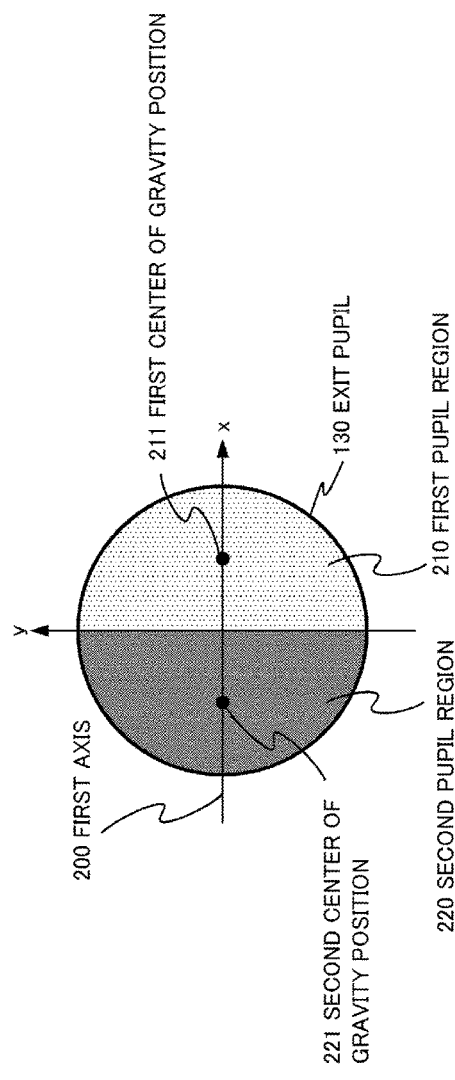

The micro-lens 170 in the pixel 150G1, shown in FIG. 2A and FIG. 2B, is disposed so that the exit pupil 130 and the light receiving layer 182 are optically conjugate with each other. As a result, the luminous flux that passed through a first pupil region 210 included in the exit pupil 130 enters the first photoelectric conversion unit 161. In the same manner, the luminous flux that passed through a second pupil region 220 enters the second photoelectric conversion unit 162.

The plurality of first photoelectric conversion units 161 disposed in each pixel photoelectrically convert the received luminous flux, and generate a first image. In the same manner, the plurality of second photoelectric conversion units 162 disposed in each pixel photoelectrically convert the received luminous flux, and generate a second image. Hereafter, the first image is also called "image A", and the second image is also called "image B".

From the first image, intensity distribution of an image, which luminous flux passed mainly through the first pupil region formed on the image sensor 101, can be acquired, and from the second image, intensity distribution of an image, which luminous flux passed mainly through the second pupil region formed on the image sensor 101, can be acquired. Hereafter, the former is also called "image A", and the latter is also called "image B".

FIG. 2B is a diagram of the exit pupil 130 of the imaging optical system 120 viewed from the intersection of the optical axis 140 and the image sensor 101. Here a center of gravity position of the first pupil region 210 is indicated by a first center of gravity position 211, and a center of gravity position of the second pupil region 220 is indicated by a second center of gravity position 221.

In this embodiment, the first center of gravity position 211 is decentered (shifted) from the center of the exit pupil 130 along a first axis 200. The second center of gravity position 221, on the other hand, is decentered (shifted) from the center of exit pupil 130 along the first axis 200 in the opposite direction of the shifting direction of the first center of gravity position 211. In other words, the first pupil region and the second pupil region are decentered along the first axis in different directions from each other.

In this embodiment, the first photoelectric conversion unit 161 is shifted from the center point of the green pixel 150G1 along the X axis (first axis) in the negative direction. In other words, the first center of gravity position 211 is decentered along the first axis in the positive direction.

The second photoelectric conversion unit 162, on the other hand, is shifted from the center point of the green pixel 150G1 along the X axis in the positive direction. In other words, the second center of gravity position 221 is decentered along the first axis in the negative direction.

The relative positional shift amount between the first image and the second image becomes the image shift amount between image A and image B. The image shift amount is an amount corresponding to the defocus amount. Therefore the distance to the object can be calculated by calculating the image shift amount between the first image and the second image by a later mentioned method, and converting this image shift amount into the defocus amount using a conversion coefficient.

In FIG. 2A and FIG. 2B, the first pupil region is illustrated assuming that X is positive, and the second pupil region is illustrated assuming that X is negative, but in reality, the light that reaches the light receiving layer 182 has a certain degree of spread due to the diffraction phenomenon of light. A certain degree of spread is also generated by the crosstalk of carriers inside the light receiving layer 182.

In other words, on occasion luminous flux that passed through a region of which X is negative enters the first photoelectric conversion unit 161, and luminous flux that passed through a region of which X is positive enters the second photoelectric conversion unit 162. This means that the first pupil region and the second pupil region are not clearly separated, but have overlapping regions. In the description of this embodiment, however, it is assumed for convenience that the first pupil region and the second pupil region are clearly separated.

Figure 3A:
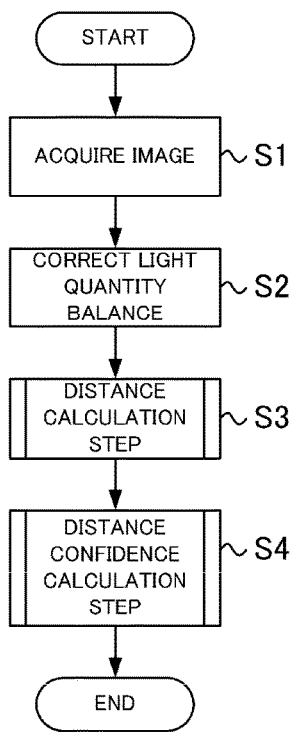
FIG. 3A to FIG. 3C are processing flow charts of a digital camera according to Embodiment 1.

Now, the processing to calculate the distance to the object using the first image and the second image will be described with reference to FIG. 3A, which is a processing flow chart performed by the distance calculation unit 102.

First, in step S1, the first image and the second image, which were acquired by the image sensor 101 and stored in the image storage unit 104, are acquired.

Then, in step S2, processing to correct the light quantity balance between the first image and the second image is performed. For the method of correcting the light quantity balance, a known method can be used. For example, images generated by photographing a uniform surface light source are stored in advance, and a coefficient for correcting the light quantity balance is calculated using these images.

Step S3 is a step of calculating a distance to the object based on the first image and the second image (distance calculation step). The distance calculation step will be described with reference to FIG. 3B and FIG. 4A.

Figure 3B:
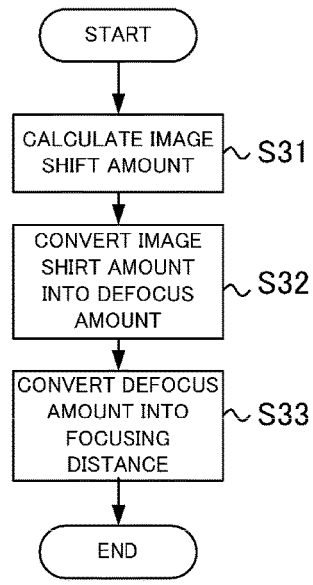

FIG. 3B is a flow chart depicting the processing performed in step S3 in detail.

First, in step S31, an image shift amount of the second image with respect to the first image is calculated. The method of calculating the image shift amount will be described with reference to FIG. 4A.

Figure 4A:
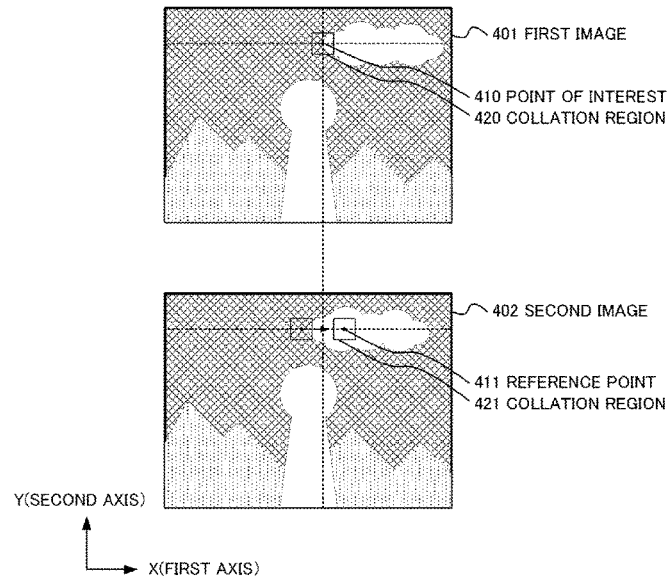
FIG. 4A and FIG. 4B are diagrams depicting steps of calculating a focusing distance.

In FIG. 4A, the reference number 401 indicates the first image, and the reference number 402 indicates the second image. It is assumed that the X axis is the first axis.

In step S31, the first image 401 is selected as a standard image, and a collation region 420 is set on the first image 401. A collation region is a local region centering around a point of interest 410. If the collation region 420 is small, a calculation error is generated in the image shift amount due to local operation, hence it is preferable that the size of the collation region is about 9 pixels×9 pixels.

Then, the second image 402 is selected as a reference image, and a collation region 421 is set in the second image 402 in the same manner. The collation region that is set in the second image is a local region centering around the reference point 411.

Then, while moving the reference point 411 along the first axis (X axis), the correlation between the image in the collation region 420 (first image) and the image in the collation region 421 (second image) is calculated, and a reference point at which correlation is highest is determined as the corresponding point. A relative positional shift amount between the point of interest 410 and the corresponding point is determined, and this is defined as the image shift amount.

By performing this processing while sequentially moving the point of interest 410 along the first axis, the image shift amount at each pixel position in the first image can be calculated. For the method of calculating the correlation, a known method can be used. For example, a method called SSD (Sum of Squared Difference), where a sum of squares of the differences between pixel values is used as an evaluation value, can be used.

Then, in step S32, the image shift amount acquired in step S31 is converted into the defocus amount using a predetermined conversion coefficient. The defocus amount is a distance from the image sensor 101 to the imaging plane, where an image is formed by the imaging optical system 120.

Here, the defocus amount ΔL can be given by Expression (1), where d denotes an image shift amount, w denotes a baseline length which is a conversion coefficient, and L denotes a distance from the image sensor 101 to the exit pupil 130.

[Math. 1]

$$\Delta L = \frac{d \cdot L}{w - d} \quad \text{Expression (1)}$$

The baseline length w is a distance between the first center of gravity position 211 and the second center of gravity position 221 shown in FIG. 2B. In this embodiment, the image shift amount is converted into the defocus amount using Expression (1), but in Expression (1), it is approximated that w is much greater than d (w>>d), hence the following Expression (2) may be used.

[Math. 2]

$$\Delta L = \text{Gain} \cdot d \quad \text{Expression (2)}$$

In step S33, the defocus amount calculated in step S32 is converted into the focusing distance. The conversion from the defocus amount to the focusing distance can be performed using the imaging relationship of the imaging optical system 120.

By the processing in step S3, distribution of focusing distance (hereafter referred to as "distance image") of the acquired image can be acquired.

Refer back to FIG. 3A to continue the description.

Figure 3C:
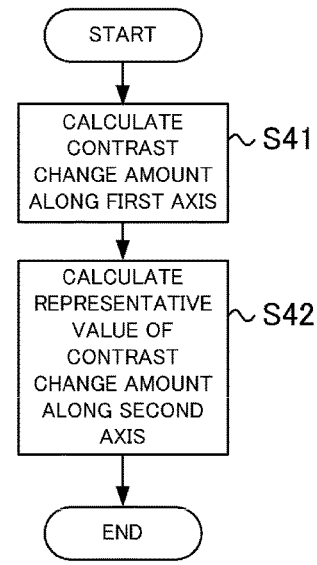

Step S4 is a step of calculating distribution of confidence of the focusing distances (hereafter referred to as "confidence image") calculated in step S3 (confidence calculation step). The confidence calculation step will be described with reference to FIG. 3C and FIG. 4B. FIG. 3C is a detailed flow chart depicting the step performed in step S4.

First in step S41, the contrast change amount is calculated along the first axis.

Figure 4B:
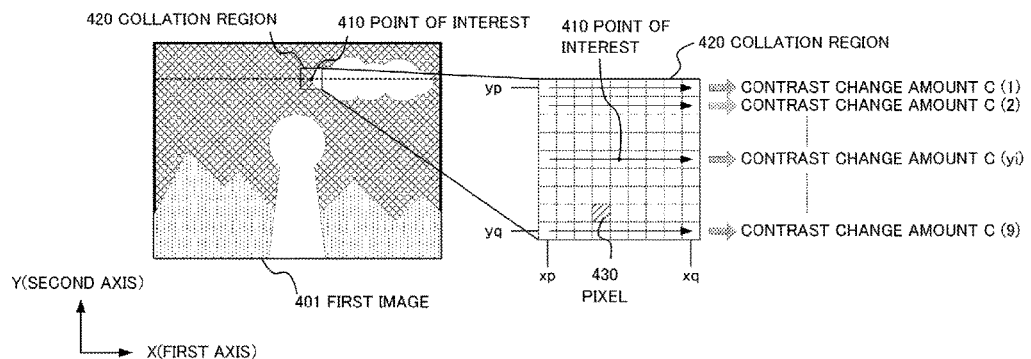

The method of calculating the contrast change amount will be described with reference to FIG. 4B. FIG. 4B is a diagram depicting the first image 401, and the point of interest 410 and the collation region 420 which are set in this image.

In FIG. 4B, a hatched region 430 indicates one pixel. In this example, it is assumed that the collation region 420 is in a range where the X coordinate is Xp to Xq and the Y coordinate is Yp to Yq. It is also assumed that the coordinates of the point of interest 410 is (Xc, Yc).

In this embodiment, as the contrast change amount, the variance of each pixel value of the first image included in the collation region 420 is calculated for each Y coordinate along the first axis (that is, X axis).

The contrast change amount C(x,y) can be given by Expression (3) and Expression (4). I(x,y) is a pixel value of the first image at a position (x,y) in a pixel array, and Nx is a number of pixels in the X axis direction included in the collation region 420.

Hereafter the contrast change amount acquired for each Y coordinate is referred to as "first value".

[Math. 3]

$$C(x, y) = \frac{1}{Nx} \sum_{xi=xp}^{xq} (I(xi, y) - Iave)^2 \quad \text{Expression (3)}$$

[Math. 4]

$$Iave = \frac{1}{Nx} \sum_{xi=xp}^{xq} I(xi, y) \quad \text{Expression (4)}$$

Then in step S42, a representative value of a plurality of first values acquired in the second axis (that is, Y axis) direction (hereafter this representative value is referred to as "second value"). In this embodiment, a mean value of the first values is calculated as the representative value of the first values.

In other words, the representative value Conf(x,y) of the contrast change at the point of interest 410 is given by Expression (5). Ny denotes a number of pixels in the Y direction included in the collation region 420.

[Math. 5]

$$Conf(x, y) = \frac{1}{Ny} \sum_{yi=yp}^{yq} C(x, yi)$$

Expression (5)

In this embodiment, a set of the representative values of the contrast change (Conf) determined like this is defined as a distance confidence corresponding to the focusing distance.

Here, as the variance of the first value is greater, the contrast change in the first image in the first axis direction is greater. Further, the magnitude of the contrast change amount that contributes to the calculation of the image shift amount of the first image, included in the collation region 420, can be calculated by averaging the variances of the pixel values along the second axis.

In the distance calculation apparatus 110 according to this embodiment, the first photoelectric conversion unit 161 and the second photoelectric conversion unit 162 are disposed side-by-side along the X axis, which is the first axis. Therefore an image shift is generated between the first image and the second image along the first axis.

In such a case, the image shift amount can be accurately detected if the object has the contrast change in a direction parallel with the X axis, but the detection error in the image shift amount increases if the contrast change of the object is small in a direction parallel with the X axis.

In other words, an error in the image shift amount can be estimated based on the magnitude of the contrast change.

The relationship between the contrast change and the image shift amount will be described with reference to FIG. 5A to FIG. 5D.

FIG. 5A shows the brightness distribution of an object 510 having a contrast change in the direction parallel with the X axis, and the first image 511 and the second image 512 which are acquired by imaging this object.

The solid line in FIG. 5B indicates the pixel values of the first image 511, and the broken line indicates the pixel values of the second image. As this graph shows, the first image 511 and the second image 512 are shifted in the X direction if the object 510 is in the defocus state.

The object 510 has a contrast change in the brightness values in the X direction, therefore the image shift amount can be accurately calculated by using the corresponding point search method, which was described with reference to FIG. 4A.

FIG. 5C, on the other hand, shows the brightness distribution of an object 520 having a contrast change in the direction parallel with the Y axis, and the first image 521 and the second image 522 which are acquired by imaging this object.

Just like FIG. 5B, FIG. 5D shows the pixel values of the first image in the X direction and the pixel values of the second image in the X direction, but in FIG. 5D, the solid line and the broken line overlap. This is because an image shift was generated between the first image and the second image in the X direction. Therefore if there is no contrast change in the X direction like this, it is difficult to detect the image shift amount.

Therefore, in this embodiment, the contrast change amount (first value) is calculated first by calculating the variances of the pixel values along the first axis (X axis) in step S41, and then the mean value of the first values (second value) is calculated along the second axis in step S42. The second value acquired like this is defined as the confidence of the distance.

If the distance confidence is calculated by this method, the evaluation result indicating high confidence is acquired for the object 510 in FIG. 5A, and the evaluation result indicating low confidence is acquired for the object 520 in FIG. 5C. In other words, the distance confidence can be correctly calculated.

In the case of the confidence calculation method disclosed in Japanese Patent No. 3855812, on the other hand, the variances of all the pixel values included in the collation region are calculated without considering the direction in which the image shift is generated. In other words, the variances become approximately the same values in both FIG. 5A and FIG. 5C. Therefore if an object having a contrast change only in the Y direction is imaged, as in the case of FIG. 5C, an incorrect distance confidence may be generated.

Some of the prior art techniques for calculating confidence use correlation. For example, in the case of the apparatus disclosed in Japanese Patent No. 5066851, confidence is calculated by using the ratio between the minimum value of the correlation value and the slope calculated from the correlation value near the minimum value. In such a case, if local noise exists, the correlation value disperses, and as a result, a larger slope may be calculated or smaller minimum value may be calculated in error.

FIG. 6A shows the brightness distribution of an object 610 of which contrast ratio is 2.0, and a first image 611 and a second image 612 which were acquired by imaging this object. FIG. 6B shows the brightness distribution of an object 620 of which contrast ratio is 1.25, and a first image 621 and a second image 622 which were acquired by imaging this object. In both FIG. 6A and FIG. 6B, noise corresponding to ISO sensitivity 100 has been added.

FIG. 6C shows graphs on the object 610 and the object 620 respectively, where the abscissa indicates the moving distance of the reference point, and the ordinate indicates the correlation value using SSD (that is, the sum of squares of the differences of the pixel values). The solid line 613 in FIG. 6C indicates the correlation value of the object 610, and the broken line 623 indicates the correlation value of the object 620. Since SSD is used here, the correlation is higher as the correlation value is smaller. The arrow mark 630 indicates the correct value of the image shift amount, and the arrow mark 640 indicates the image shift amount calculation result of the object 610. The arrow mark 650 indicates the image shift amount calculation result of the object 620. As FIG. 6C shows, the image shift amount can be more accurately calculated as the contrast ratio is higher.

Table 1 shows the comparison of the confidence of distance calculated in the confidence calculation step according to this embodiment, and the confidence calculated using the ratio of the minimum value of the correlation value and the slope of the correlation value near the minimum value, as disclosed in Japanese Patent No. 5066851 (hereafter referred to as "comparative example").

The distance confidence according to this embodiment is higher as the value thereof is greater, and the distance confidence according to the comparative example is higher as the value thereof is smaller. In the case of the comparative example, high distance confidence was calculated for the object 620, even if the calculation error of the image shift amount is large. This is because in an area near the minimum value of the correlation values, a larger slope of the correlation value near the minimum value is evaluated due to the influence of local noise.

In the case of the method of calculating distance confidence according to this embodiment, on the other hand, the contrast change of the pixel values included in the collation region in the X direction is evaluated by variance, therefore evaluation is hardly influenced by local noise. As a result, if an object of which contrast ratio is low, such as the case of the object 620, is imaged, a low distance confidence is calculated.

TABLE 1

|  | Distance confidence of this embodiment | Distance confidence of comparative example | Correct distance confidence |
|---|---|---|---|
| Object 610 (calculation error of image shift amount is small) | High (evaluation value = 70) | Low (evaluation value = 33.7) | High |
| Object 620 (calculation error of image shift amount is large) | Low (evaluation value = 52) | High (evaluation value = 6.7) | Low |

According to this embodiment, the distance is calculated first in step S3, and then the distance confidence is calculated in step S4, but step S3 and step S4 may be executed in reverse. By executing step S4 before step S3, the distance confidence can be acquired in advance. Then parameters used for calculating the focusing distance (e.g. size of collation region 420, range of searching corresponding points) can be set based on the distance confidence acquired in advance, whereby calculation accuracy of the focusing distance can be improved.

As described above, in the case of the distance calculation apparatus according to this embodiment, the contrast change amount is calculated along the first axis, which is the pupil dividing direction axis, by calculating variances of the pixel values along the first axis. Further, if the representative value of the contrast change amount is calculated along the second axis, only the magnitude of the contrast change in the first axis direction included in the collation region can be evaluated.

As a result, only the contrast change that contributes to the calculation of the image shift amount can be evaluated, and the distance confidence can be accurately calculated. Further, the influence of local noise can be reduced by performing statistical evaluation using the pixels included in the collation region.

In this embodiment, the variances of the pixel values are calculated as the contrast change amount, but values other than the variances may be used as long as the magnitude of the contrast change can be evaluated. For example, a standard deviation, an absolute value of the difference between the maximum value and the minimum value of the pixel values, or the maximum value (or a mean value) of the absolute values when the pixel values are differentiated in the first axis direction may be used. To minimize the influence of noise, it is preferable to use the variances or the standard deviation, which are the result of statistical evaluations.

In this embodiment, the mean value of the first values was used as the second value, but a value other than a mean value may be used as long as the representative value of the first values in the collation region can be calculated. For example, a total value, a maximum value, a minimum value, a median, a mode or the like may be used.

The method of calculating the second value, however, preferably corresponds to the correlation value computing method which was used for calculating the image shift amount. In other words, if the sum of absolute values of the differences or the sum of squares of the differences is used as the correlation value of the image shift amount computation, then it is preferable to use the total value or the mean value, which is calculated based on the sum.

In this embodiment, the contrast change amount is calculated using only the first image in step S4, but both the first image and the second image may be used. Further, a third image may be generated by combining the first image and the second image, and this third image may be used for calculating the contrast change amount. In this case, the first image and the second image can be combined using the sum of or the mean value of the pixel values of the corresponding pixel positions.

Embodiment 2

In Embodiment 1, the distance confidence calculation step (step S4) is executed after executing the distance calculation step (step S3). In Embodiment 2, on the other hand, the distance calculation and the distance confidence calculation are executed in a same step.

Figures 7A, 7B:
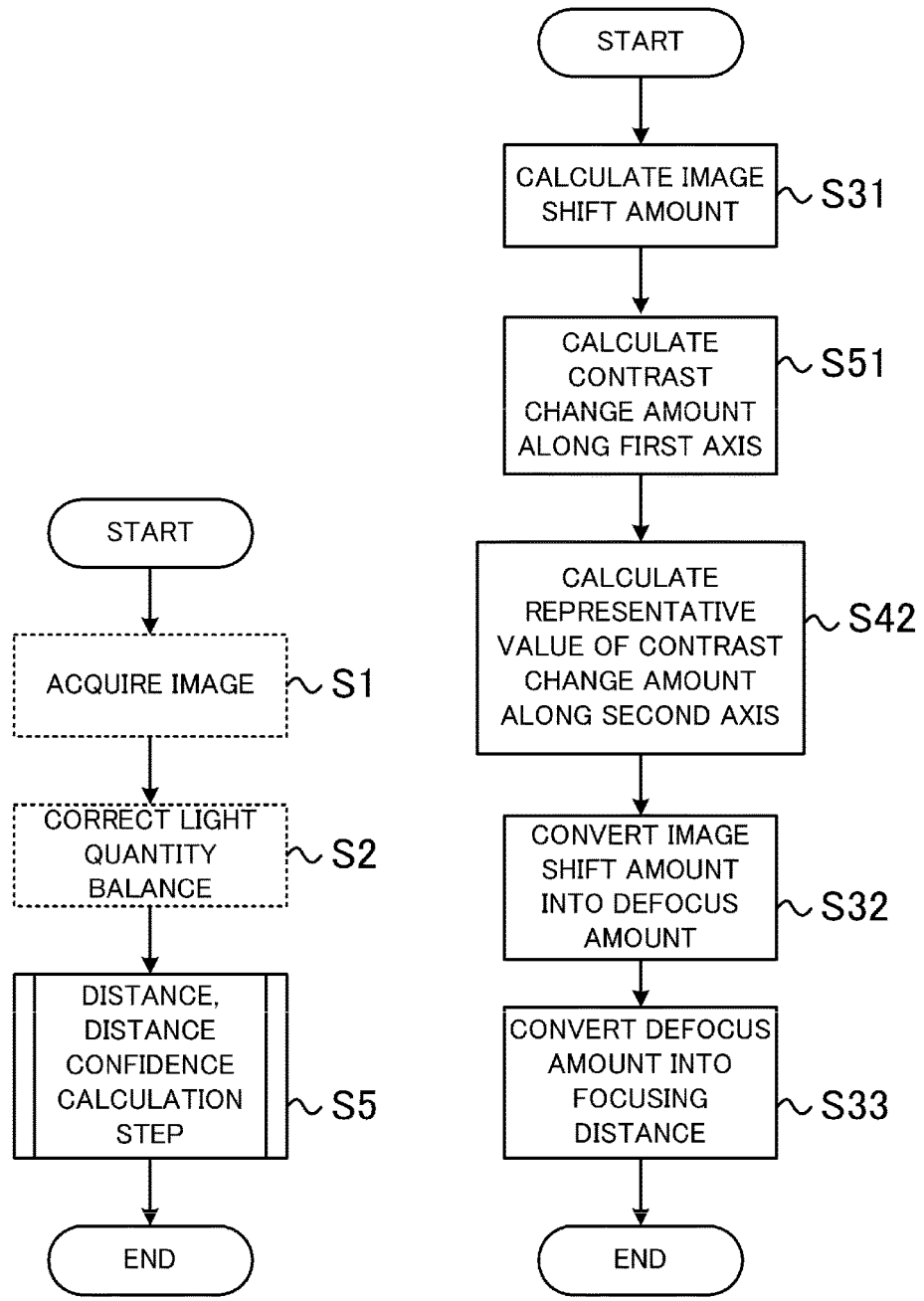
FIG. 7A and FIG. 7B are processing flow charts of a digital camera according to Embodiment 2.

FIG. 7A is a processing flow chart performed by the distance calculation unit 102 according to Embodiment 2.

A difference between Embodiment 2 and Embodiment 1 is that the focusing distance and the distance confidence are calculated simultaneously in step S5 of Embodiment 2 instead of step S3 and step S4 of Embodiment 1.

Now, the processing to be executed in step S5 will be described in detail with reference to FIG. 7B.

A description of step S31, which is the same as Embodiment 1, will be omitted.

In this embodiment, after the image shift amount is calculated in step S31, a step of generating a third image by combining the first image and the second image, and calculating the contrast change amount using the third image (step S51) is executed.

In concrete terms, the point of interest and the collation region used for calculating the image shift amount in step S31 are set for the first image. Then, the corresponding point calculated in step S31 and a collation region centering around the corresponding point are set for the second image. Then a third image is generated, which is a composite image of the first image and the second image included in the collation region. The composite image can be generated using the sum of or the mean of the corresponding pixels.

Then, using the generated third image, variances of the third image are calculated along the first axis, just like step S41, whereby the first value is calculated.

A description of step S42, step S32 and step S33, which are the same as Embodiment 1, will be omitted.

In Embodiment 2, the contrast change amount is calculated like this, using the third image, which is an image generated by combining the first image and the second image. Since the contrast change amount can be calculated under conditions similar to those used when the image shift amount was calculated, the calculation accuracy of the distance confidence can be improved.

In some cases, the contrast change amount may be different between the first image and the second image depending on the imaging environment, such as when vignetting of the imaging optical system is generated in the peripheral angle of view of the image sensor 101. In Embodiment 2, however, the contrast change amount is calculated after integrating the first image and the second image, hence even in such a case, calculation accuracy of the distance confidence can be ensured.

In this embodiment, the third image is generated after calculating the image shift amount in step S31, but the third image may be generated before calculating the image shift amount. In concrete terms, the third image may be generated by combining the image of the collation region, which was used for calculating the image shift amount, of the first image (signals of a plurality of first photoelectric conversion units) and a corresponding image of the collation region of the second image (signals of a plurality of second photoelectric conversion units forming pairs with the plurality of first photoelectric conversion units). If the image sensor 101 is configured to output signals generated by combining the signals of the first photoelectric conversion units 161 and the signals of the second photoelectric conversion units 162, it is preferable to generate the third image in this way.

Embodiment 3

In Embodiments 1 and 2, two photoelectric conversion units are used for each pixel. In Embodiment 3, however, four photoelectric conversion units are disposed in each pixel.

Figure 8A:
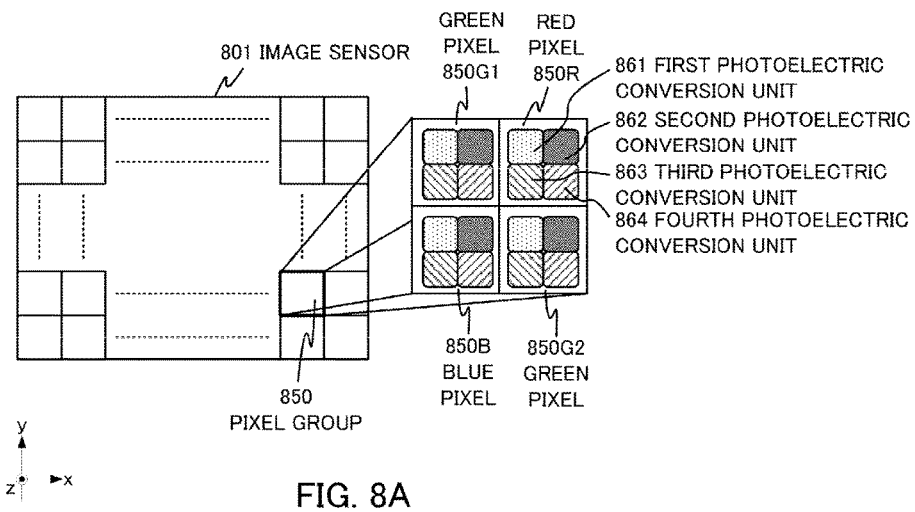
FIG. 8A and FIG. 8B are diagrams depicting an image sensor and an exit pupil according to Embodiment 3.

FIG. 8A is an X-Y cross-sectional view of an image sensor 801 according to Embodiment 3. In the image sensor 801 according to Embodiment 3, a plurality of pixel groups 850 (each pixel group consists of 2×2 pixels) are arrayed. In concrete terms, green pixels 850G1 and 850G2 are diagonally disposed, and a red pixel 850R and a blue pixel 850B are disposed in the other two pixels.

In each pixel, four photoelectric conversion units (first photoelectric conversion unit 861, second photoelectric conversion uni 862, third photoelectric conversion unit 863 and fourth photoelectric conversion uni 864) are juxtaposed.

Figure 8B:
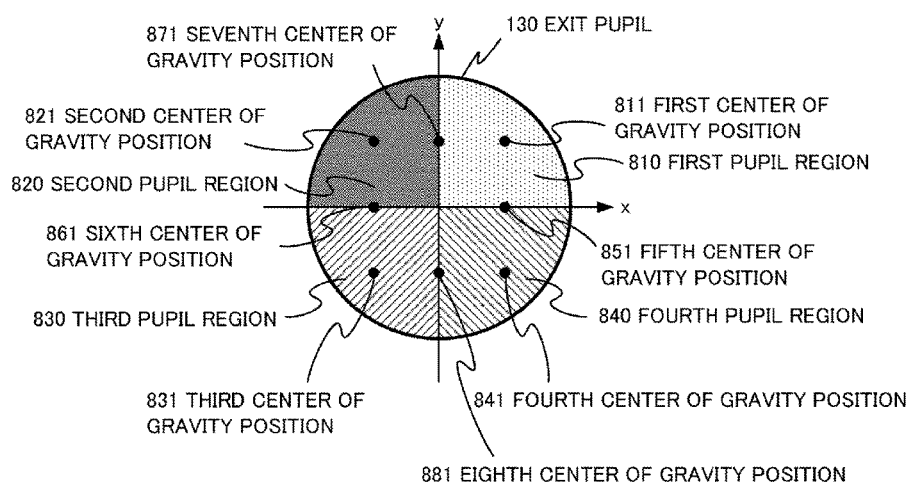

FIG. 8B is a diagram of the exit pupil 130 of the imaging optical system 120 viewed from the intersection of the optical axis 140 and the image sensor 801. A plurality of first photoelectric conversion units disposed in each pixel photoelectrically-convert the luminous flux that passed through a first pupil region 810 and generate a first image. In the same way, the second photoelectric conversion unit, the third photoelectric conversion unit and the fourth photoelectric conversion unit photoelectrically-convert the luminous flux that passed through a second pupil region 820, a third pupil region 830 and a fourth pupil region 840, and generate a second image, a third image and a fourth image respectively.

In FIG. 8B, a center of gravity position of the first pupil region 810 is indicated by a first center of gravity position 811, and a center of gravity position of the second pupil region 820 is indicated by a second center of gravity position 821. Further, a center of gravity position of the third pupil region 830 is indicated by a third center of gravity position 831, and a center of gravity position of the fourth pupil region 840 is indicated by a fourth center of gravity position 841.

Furthermore, a center of gravity position of a combined region (hereafter referred to as "total region") of the first pupil region and the fourth pupil region is indicated by a fifth center of gravity position 851, and a center of gravity position of a total region of the second pupil region and the third pupil region is indicated by a sixth center of gravity position 861. Further, a center of gravity position of a total region of the first pupil region and the second pupil region is indicated by a seventh center of gravity position 871, and a center of gravity position of a total region of the third pupil region and the fourth pupil region is indicated by an eighth center of gravity position 881.

In Embodiment 3, the direction of generating the image shift can be changed by changing the combination of images to be combined.

For example, in a fifth image, which is an image generated by combining the first image and the fourth image, the luminous flux that passed through the first pupil region 810 and the fourth pupil region 840 generates intensity distribution of an image formed on the image sensor 801. In a sixth image, which is an image generated by combining the second image and the third image, the luminous flux that passed through the second pupil region 820 and the third pupil region 830 generates intensity distribution of an image formed on the image sensor 801.

The center of gravity position 851 of the total region corresponding to the fifth image and the center of gravity position 861 of the total region corresponding to the sixth image are decentered along the X axis in different directions from each other. Therefore, the image shift is generated along the X axis. In this case, the above mentioned distance confidence calculation can be performed by defining the X axis as the first axis and the Y axis as the second axis.

Now, a method of generating the image shift along the Y axis will be described.

In a seventh image generated by combining the first image and the second image, the luminous flux that passed through the first pupil region 810 and the second pupil region 820 generates intensity distribution of an image formed on the image sensor 801. In an eighth image generated by combining the third image and the fourth image, the luminous flux that passed through the third pupil region 830 and the fourth pupil region 840 generates intensity distribution of an image formed on the image sensor 801.

The center of gravity position 871 of the total region corresponding to the seventh image and the center of gravity position 881 of the total region corresponding to the eighth image are decentered along the Y axis in different directions from each other. Therefore the image shift is generated along the Y axis. In this case, the above mentioned distance confidence calculation can be performed by defining the Y axis as the first axis and the X axis as the second axis.

By changing the combination of images to be combined in this way, the axis along which the image shift is generated can be changed.

In Embodiment 3, the distance confidence is calculated by appropriately setting the first axis and the second axis according to the axis along which the image shift is generated. Thereby the axis along which the image shift is generated can be changed according to the direction of the contrast of the object, and the distance to the object can be accurately calculated.

For example, if an object has a contrast change only in the X direction, as in the case of object 510 in FIG. 5A, the image shift amount is calculated using the fifth image and the sixth image. Since the image shift is generated along the X axis in this case, the distance to the object can be accurately calculated.

If an object has a contrast change only in the Y direction, as in the case of object 520 in FIG. 5B, the image shift amount is calculated using the seventh image and the eighth image. Since the image shift is generated along the Y axis in this case, the distance to the object can be accurately calculated.

However, the axis along which the contrast change is generated is unknown in advance. Therefore in Embodiment 3, a plurality of combinations are generated for the images to be combined, the focusing distance and the distance confidence are calculated for each combination, and the focusing distance of which confidence is highest is selected. As a result, the focusing distance can be accurately calculated.

Figure 9A:
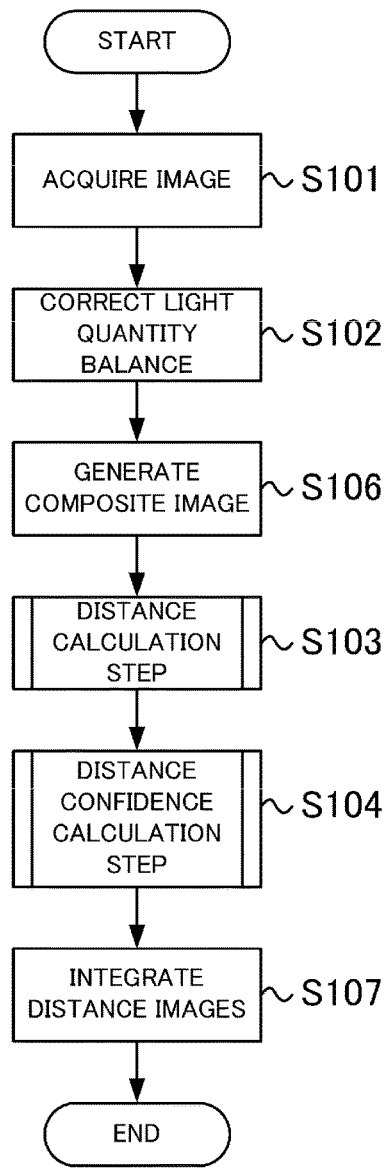
FIG. 9A and FIG. 9B are processing flow charts of a digital camera according to Embodiment 3.

FIG. 9A is a processing flow chart performed by the distance calculation unit 102 according to Embodiment 3.

Step S101 and step S102 are the same as step S1 and step S2 in Embodiment 1, except that the number of processing target images is not two but four (the first image to the fourth image).

In step S106, a composite image is generated using four images. In concrete terms, the following four images are generated.
(1) The fifth image is generated by averaging the pixel values of the pixels located in the corresponding positions of the first image and the fourth image.
(2) The sixth image is generated by averaging the pixel values of the pixels located in the corresponding positions of the second image and the third image.
(3) The seventh image is generated by averaging the pixel values of the pixels located in the corresponding positions of the first image and the second image.
(4) The eighth image is generated by averaging the pixel values of the pixels located in the corresponding positions of the third image and the fourth image.

Step S103 is the same as step S3 in Embodiment 1, except that two patterns of distance images are generated.

In concrete terms, a first distance image is generated using the fifth image and the sixth image, and a second distance image is generated using the seventh image and the eighth image. The procedure in FIG. 3B can be used to generate the distance images.

First, to generate the first distance image, the fifth image is selected as the standard image, and the sixth image is selected as the reference image. Then to generate the second distance image, the seventh image is selected as the standard image, and the eighth image is selected as the reference image.

The baseline length for converting the image shift amount, which was calculated based on the fifth image and the sixth image, into the defocus amount is the distance between the fifth center of gravity position 851 and the sixth center of gravity position 861. The baseline length for converting the image shift amount, which was calculated based on the seventh image and the eighth image, into the defocus amount is the distance between the seventh center of gravity position 871 and the eighth center of gravity position 881.

Step S104 is a step of calculating the distance confidence. In this step, a first confidence image is calculated based on the fifth image, and furthermore, a second confidence image is calculated based on the seventh image. The procedure in FIG. 3C can be used to calculate the confidence images.

Step S107 is a step of integrating the first distance image and the second distance image to generate a single distance image (integrated distance image). In this step, a weighted mean of the first distance image and the second distance image is determined using the first confidence image and the second confidence image. In other words, the first confidence image and the second confidence image are compared, and the first distance image and the second distance image are averaged such that the ratio of the distance having a higher confidence becomes higher, whereby the integrated distance image is acquired.

As described above, according to Embodiment 3, the plurality of distance images and the confidence images are calculated by combining a plurality of images, and a weighted integrated distance image is calculated so that the confidence is increased. Thereby the calculation accuracy of the focusing distance can be further improved.

In Embodiment 3, a plurality of distance images are calculated and weighted based on the confidence images before integrating the distance images, but the confidence images may be calculated first, and the distance image may be calculated based on the calculation result.

Figure 9B:
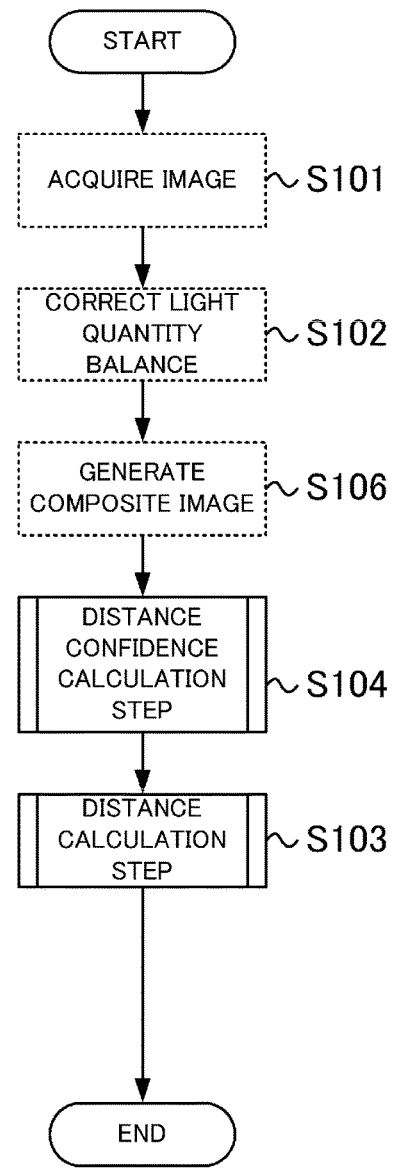

FIG. 9B is a modification of the processing flow chart.

In this modification, a confidence image is calculated for each combination of the images of a composite image in step S104, and the distance image is generated using the combination of the images of a composite image of which confidence is the highest in step S103. By calculating the confidence images for each combination of the images of a composite image in advance, the computation amount in step S103 can be reduced.

Further, in Embodiment 3, a case of generating the image shift along the X axis and a case of generating the image shift along the Y axis by changing the combination of images of a composite image were described, but the direction of the image shift need not be a direction parallel with the X axis or the Y axis. For example, a combination of the first image and the third image, or a combination of the second image and the fourth image, may be used in order to generate an image shift along an axis that is 45° from the X axis. In any case, an axis, parallel with the axis along which the image shift is generated, is defined as the first axis, and an axis perpendicular to the first axis is defined as the second axis.

If the image shift can be generated by using the first image and the second image alone, then a composite image need not be generated.

Embodiment 4

In Embodiment 4, the method of calculating the distance confidence is different from Embodiment 1.

Figure 10A:
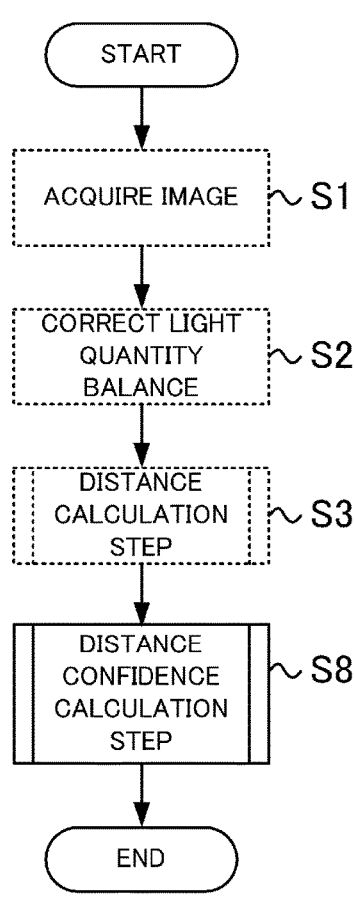
FIG. 10A and FIG. 10B are processing flow charts of a digital camera according to Embodiment 4.
Figure 10B:
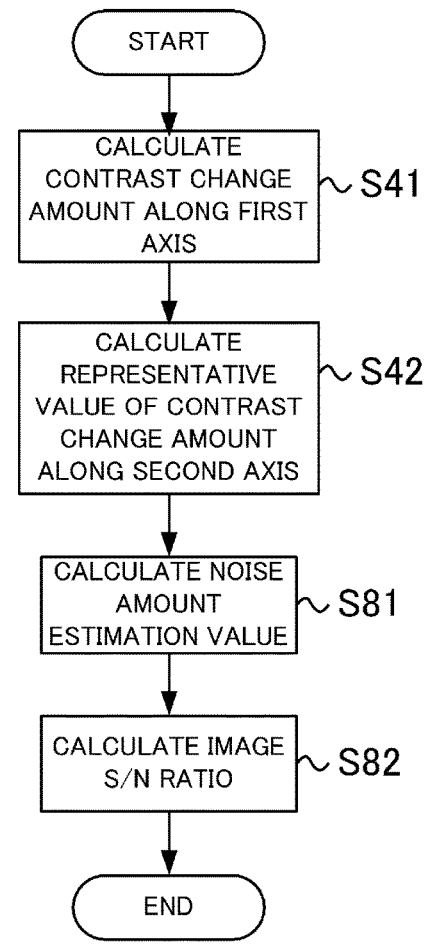

FIG. 10A is a processing flow chart performed by the distance calculation unit 102 according to Embodiment 4, and FIG. 10B is a flow chart depicting the processing executed in step S8 in detail.

A description of step S1 to step S3 and step S41 and step S42, which are the same as Embodiment 1, will be omitted.

Step S81 is a step of estimating the noise amount.

In this step, the noise amount, that is generated in the image sensor 101 when an object having a uniform brightness distribution is photographed by the digital camera 100, is estimated in advance. In concrete terms, the noise generated in the image sensor is expressed using an approximate expression, and the distribution of the noise on the image detector plane is generated.

The noise generated in the image sensor 101 are: read noise, light shot noise, dark current shot noise and the like. Here the noise amount is approximated using Expression (6). Thereby a noise amount estimation value (N(x,y)) at a pixel position (x,y) can be acquired.

ISO denotes an ISO sensitivity when an object is photographed by the digital camera 100, and I(x,y) denotes a pixel value of the first image at the pixel position (x,y). A and B denote approximate parameters.

[Math. 6]

$$N(x,y)=ISO \cdot \sqrt{A^2+(B \cdot I(x,y))^2} \qquad \text{Expression (6)}$$

Figure 11A:
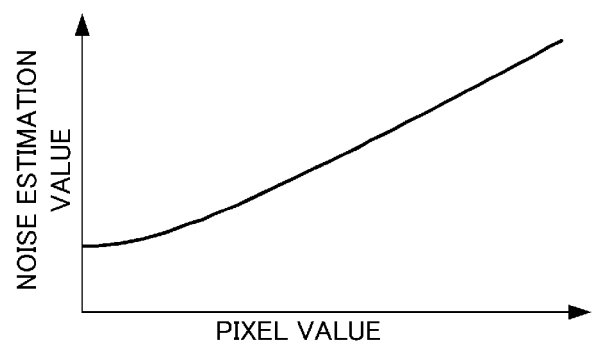
FIG. 11A and FIG. 11B are graphs for describing a noise approximation method according to Embodiment 4.

FIG. 11A is a graph showing an example of the noise amount estimation result given by Expression (5). The abscissa indicates the pixel value, and the ordinate indicates the estimated noise amount.

In this example, by using this approximate expression, the graph becomes close to the linear function when the pixel value is large, and becomes close to the approximate parameter A, deviating from the linear function, when the pixel value is small. This is because the influence of the light shot noise becomes more dominant as the pixel value increases, and the influence of read noise and the dark current shot noise increases as the pixel value decreases.

If an approximate expression considering the noise characteristic generated in the image sensor 101 is used as in this example, the noise amount can be more accurately approximated. In Expression (6), the approximate parameter A is a constant, but may be a variable related to the exposure time at photographing. By this, the influence of the dark current shot noise can be more accurately expressed.

Figure 11B:
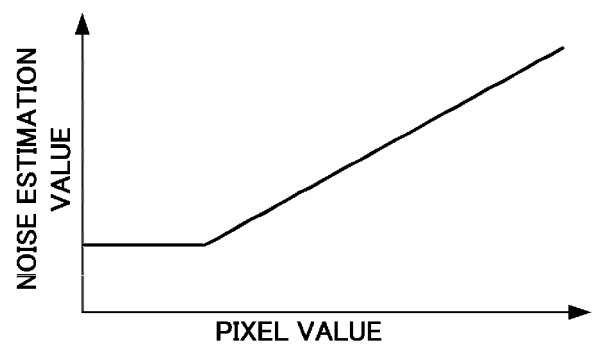

Expression (7) may be used to estimate the noise amount more easily. max(a,b) denotes a function that returns a greater value of a and b. FIG. 11B shows the noise amount estimation result when Expression (7) was used.

[Math. 7]

$$N(x,y)=ISO \cdot \max(A,B \cdot I(x,y)) \qquad \text{Expression (7)}$$

In step S82, a signal-to-noise ratio of the image (image S/N ratio) is calculated using the representative value of the contrast change amount which was calculated in step S42, and the noise amount estimation value which was calculated in step S81, and the calculated S/N ratio is output as the distance confidence. The image S/N ratio can be calculated using the ratio of the representative value of the contrast change amount and the noise amount estimation value.

As described above, according to Embodiment 4, the image S/N ratio is calculated after the noise generated in the imaging pixel is approximated, and the calculated image S/N ratio is defined as the distance confidence.

The noise amount included in an image increases when high sensitivity photography is performed, or when a high brightness object is photographed by a digital camera. If the distance confidence is calculated based on the image S/N ratio, the influence of the noise can be reduced and the distance confidence can be calculated accurately even if the noise amount is high.

In this embodiment, the pixel value of the pixel located at the position (x,y) is used to estimate the noise amount at the position (x,y) in step S82, but the noise amount may be estimated using an average pixel value of the pixels included in the collation region. By using the average pixel value in the collation region, the noise amount can be estimated under conditions close to those when the image shift amount is calculated, hence the distance confidence can be calculated even more accurately.

The expression to approximate the noise amount must be changed appropriately according to the method of evaluating the contrast change amount. For example, the approximate expression shown in Expression (6) can be suitably used for calculating the first value using the variance of the pixel values, but if the standard deviation of the pixel values is used, it is preferable to use an approximate expression which is close to the square root function.

Embodiment 5

In Embodiment 5, a distance image generated using the generated confidence image is corrected.

Figure 12A:
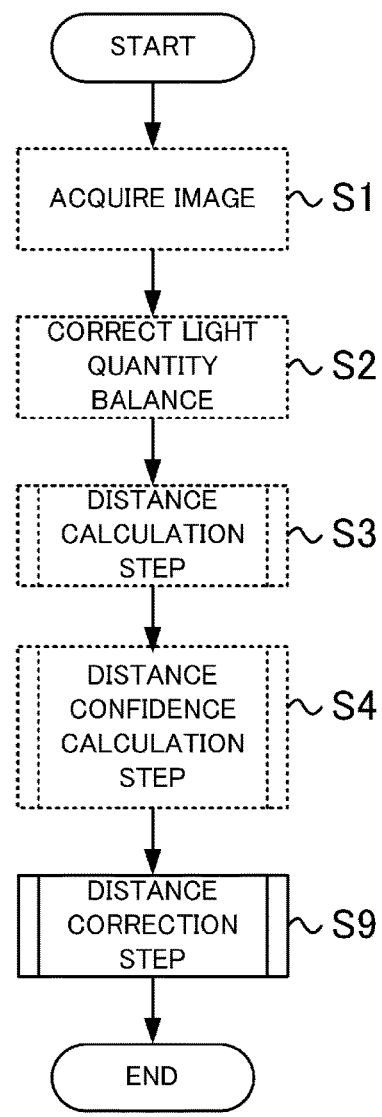
FIG. 12A and FIG. 12B are processing flow charts of a digital camera according to Embodiment 5.
Figure 12B:
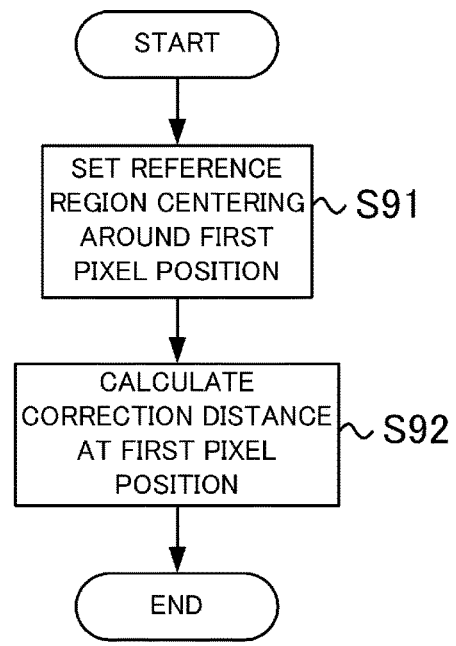

FIG. 12A is a processing flow chart performed by the distance calculation unit 102 according to Embodiment 5, and FIG. 12B is a flow chart depicting the processing executed in step S9 in detail.

A description of step S1 to step S4, which are the same as Embodiment 1, will be omitted.

Step S9 is a step of correcting the calculated distance image based on a distance image showing the distribution of the focusing distance, and a confidence image corresponding to this distance image.

In step S91, a first pixel position is set in on the distance image, and a reference region centering around the first pixel position is set.

In step S92, a corrected distance corresponding to the first pixel position is calculated. In concrete terms, by determining the weighted mean for the focusing distances included in the reference region, set in step S91, using the distance confidence, the corrected distances is calculated. Then the corrected distances are calculated while moving the first pixel position, whereby the corrected distance image is generated.

Expression (8) expresses a method of determining the weighted mean for the distance image using the confidence image.

[Math. 8]

$$Dc(x, y) = \frac{\sum_{y=yp}^{yq} \sum_{x=xp}^{xq} Conf(x, y) \cdot Dr(x, y)}{\sum_{y=yp}^{yq} \sum_{x=xp}^{xq} Conf(x, y)}. \qquad \text{Expression (8)}$$

Dr(x,y) denotes a focusing distance at a position (x,y) in the distance image, Dc(x,y) denotes a corrected focusing distance at the position (x,y), and Conf(x,y) denotes a distance confidence at the position (x,y).

In this way, according to Embodiment 5, weighted mean is determined using the distance image and the confidence image, and the corrected distance image is calculated. Thereby smoothing becomes possible with increasing the ratio in a region where a calculation error of the distance image is small. As a result, the focusing distance with even higher accuracy can be acquired.

In this embodiment, the weighted mean is determined using the distribution of the distance confidence as shown in Expression (8), but the weighted mean need not always be determined. For example, the confidence image may be divided into a region where confidence is high and a region where confidence is low, using a predetermined threshold, so that the mean values are calculated using only the distance image corresponding to the region where confidence is high, whereby the corrected distance image is calculated.

Further, in this embodiment, the distance image is corrected using only the confidence image, but image information may also be used for the correction as shown in Expression (9), for example. Ic(x,y) in Expression (9) denotes image information at position (x,y). The image information refers to, for example, hue, brightness (e.g. color difference and brightness difference based on position (x,y)), or contrast change amount (second value). The weighted mean may be determined such that the ratio decreases as the position distances from the first pixel position.

[Math. 9]

$$Dc(x, y) = \frac{\sum_{y=yp}^{yq} \sum_{x=xp}^{xq} Ic(x, y) \cdot Conf(x, y) \cdot Dr(x, y)}{\sum_{y=yp}^{yq} \sum_{x=xp}^{xq} Ic(x, y) \cdot Conf(x, y)}$$ Expression (9)

Embodiment 6

In Embodiment 6, the method of calculating the distance confidence is different from Embodiment 1.

Figure 14A:
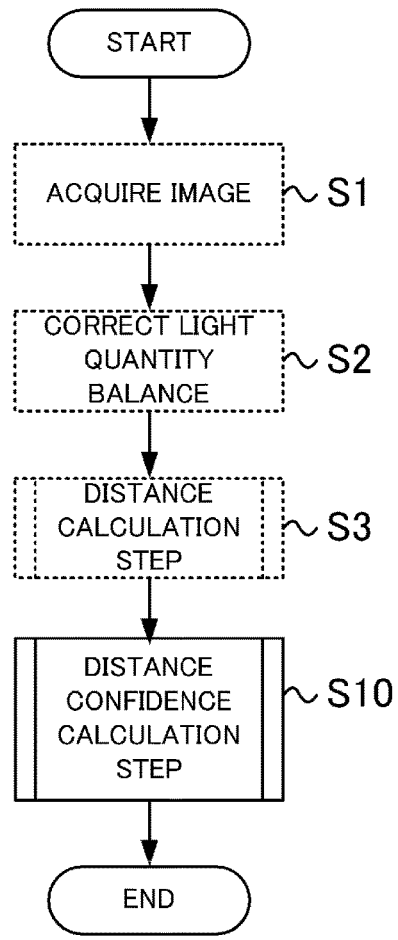
FIG. 14A and FIG. 14B are processing flow charts of a digital camera according to Embodiment 6.
Figure 14B:
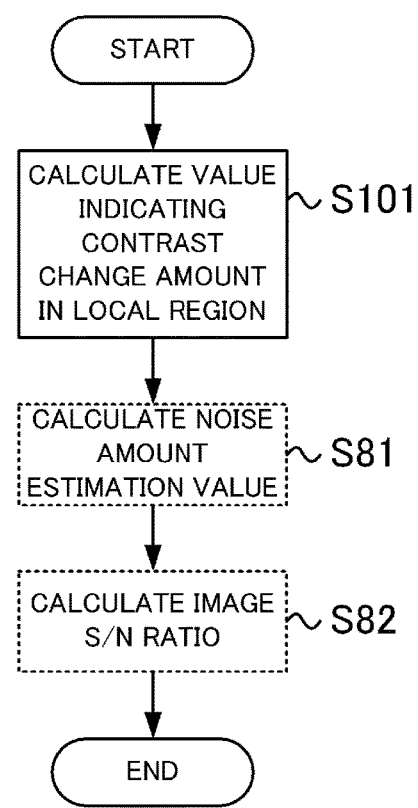

FIG. 14A is a processing flow chart performed by the distance calculation unit 102 according to Embodiment 6, and FIG. 14B is a flow chart depicting the processing executing in step S10 in detail. Description on step S1 to step S3 and step S81 and step S82, which are the same as Embodiment 4, will be omitted.

Step 10 is a step of calculating the confidence image corresponding to the focusing distance calculated in step S3 (confidence calculation step).

In step S101, a value indicating the contrast change amount (contrast evaluation value) is calculated. In this embodiment, the contrast evaluation value is calculated using the correlation degree which was used when the image shift amount is calculated in step S31. In concrete terms, the slope, calculated from the correlation degree of a point near the corresponding point having the highest correlation, is defined as the contrast evaluation value. If SSD was used for evaluating the correlation degree in step S31, the slope can be calculated by approximating the correlation degree of a point near the corresponding point using a quadratic function. In other words, the slope SLOPE can be calculated using the following Expression (10).

[Math. 10]

$$SLOPE = \left(\frac{1}{2}\right) \cdot (S(-1) - 2 \cdot S(0) + S(+1))$$ Expression (10)

In Expression (10), S denotes a correlation degree based on SSD. S(0) is the correlation degree of a reference point which has the highest correlation, S(−1) and S(+1) are correlation degrees when the moving distance from the reference point having the highest correlation is a −1 pixel and a +1 pixel respectively.

Step S81 is a step of estimating the noise amount. Just like Embodiment 4, the noise amount is estimated using either Expression (6) or Expression (7). In this embodiment, an example when SSD is used for evaluating the correlation degree in step S31 will be described. Since SSD uses a sum of squares of the differences between pixel values as the evaluation value, the contrast evaluation value calculated in step S101 has degree n=2. It can be approximated that the light shot noise is in proportion to a square root of the number of photons, hence if a pixel value is large, the noise amount is estimated by approximating the pixel value using a linear polynomial or by using an expression close to a linear polynomial.

In step S31, the contrast evaluation value may be calculated based on the slope of the correlation degree using sum of absolute difference (SAD), which uses the sum of absolute values of the differences as the evaluation value, instead of using SSD. In this case, the contrast evaluation value has degree n=1. If a pixel value is large in such a case, it is preferable that the noise amount is estimated by approximating the pixel value using a square root function, or by using an expression close to a square root function. In other words, it is preferable that the estimated noise amount estimation value N is calculated using the following Expression (11) or Expression (12), where n is a degree of the contrast evaluation value, and A and B are constants. The value I(x,y) denotes image information at the position (x,y).

[Math. 11]

$$N(x, y) = ISO \cdot \sqrt{A^n + (B \cdot I(x, y))^n}$$ Expression (11)

[Math. 12]

$$N(x, y) = ISO \cdot \max\left(A, (B \cdot I(x, y))^{\frac{n}{2}}\right)$$ Expression (12)

In this embodiment, the pixel values of the pixel at the position (x,y) is used to estimate the noise amount at the position (x,y) in step S81, but the noise amount may be estimated using the mean pixel values of the pixels included in the collation region. By using the mean pixel values in the collation region, the noise amount can be estimated under conditions close to those used when the image shift amount was calculated, therefore the distance confidence can be calculated even more accurately.

In this embodiment, the distance confidence is calculated in step S82, based on the ratio of the contrast evaluation value calculated in step S101 and the noise amount calculated in step S81. However, if an amount of noise generated in the imaging pixels is high, the contrast evaluation value calculated based on the slope of the correlation degree may in some cases be incorrectly calculated in step S101. Therefore if the noise amount calculated in step S81 exceeds a predetermined threshold, a predetermined value, indicating that the distance confidence is low, may be used as the distance confidence in step S82, without calculating the ratio. Thereby a case of incorrectly determining low distance confidence as high distance confidence can be prevented.

In this way, according to Embodiment 6, the image S/N ratio is calculated after approximating the noise generated in the imaging pixels, and the calculated image S/N ratio is used as the distance confidence. When high sensitivity photographing is performed or when a high brightness object is photographed using a digital camera, the amount of noise included in the image increases. By directly calculating the noise amount included in the imaging pixels from the photographed image, the noise amount is estimated even more accurately. As a result, the distance confidence can be calculated even when the noise amount is high.

(Modification)

The description of the embodiments is merely an example to describe the present invention, and the present invention can be carried out by appropriately modifying or combining the embodiments within a scope that does not depart from the spirit of the invention. For example, the present invention may be carried out as a distance calculation apparatus that includes at least a part of the above mentioned processing, or may be carried out as a distance calculation method. Further, the present invention may be carried out as a program that causes the distance calculation apparatus to execute this control method. The above mentioned processings and units may be freely combined as long as no technical inconsistency is generated.

In the description of the embodiments, the digital camera was shown as an example of an imaging apparatus equipped with the distance calculation apparatus according to the present invention, but the present invention may be applied to other apparatuses. For example, the present invention may be applied to a digital distance measuring apparatus.

Figure 15A:
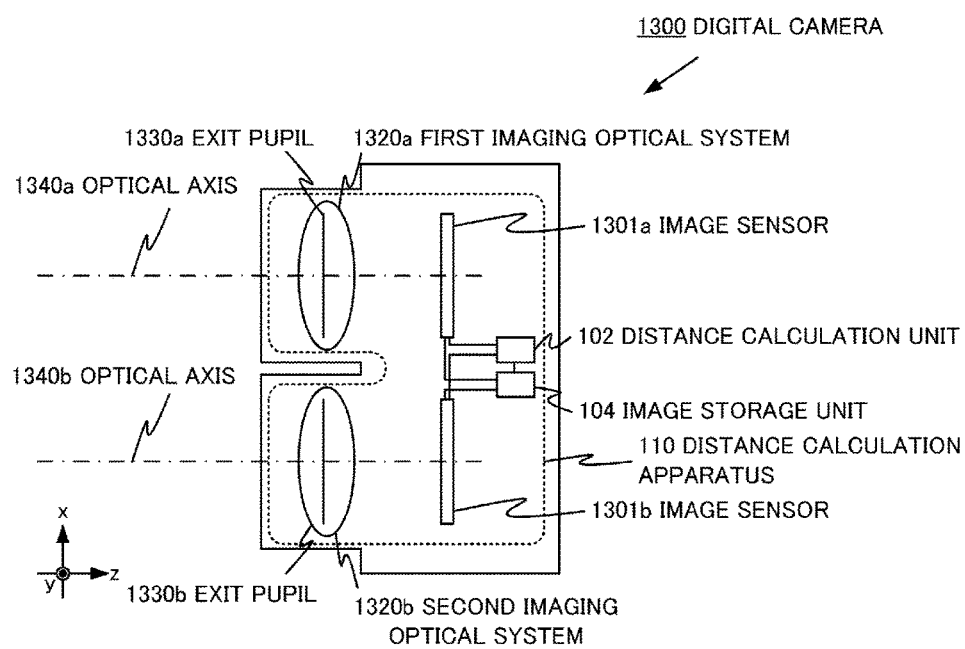
FIG. 15A and FIG. 15B are diagrams depicting a configuration of a digital camera according to a modification.

In the description of the embodiments, a digital camera that has one imaging optical system and one image sensor was shown as an example, but two imaging optical systems and two image sensors may be included as in the case of the digital camera 1300 shown in FIG. 15A.

In this example, a first imaging optical system 1320a and a second imaging optical system 1320b are the photographing lenses of the digital camera 1300, and have a function to form an image of the object on an image sensor 1301a and an image sensor 1301b, which are image detector planes, respectively.

The first imaging optical system 1320a is constituted by a plurality of lens groups and a diaphragm, and has an exit pupil 1330a at a position that is distant from the image sensor 1301a by a predetermined distance. In the same manner, the second imaging optical system 1320b is constituted by a plurality of lens groups and a diaphragm, and has an exit pupil 1330b at a position that is distant from the image sensor 1301b by a predetermined distance.

Figure 15B:
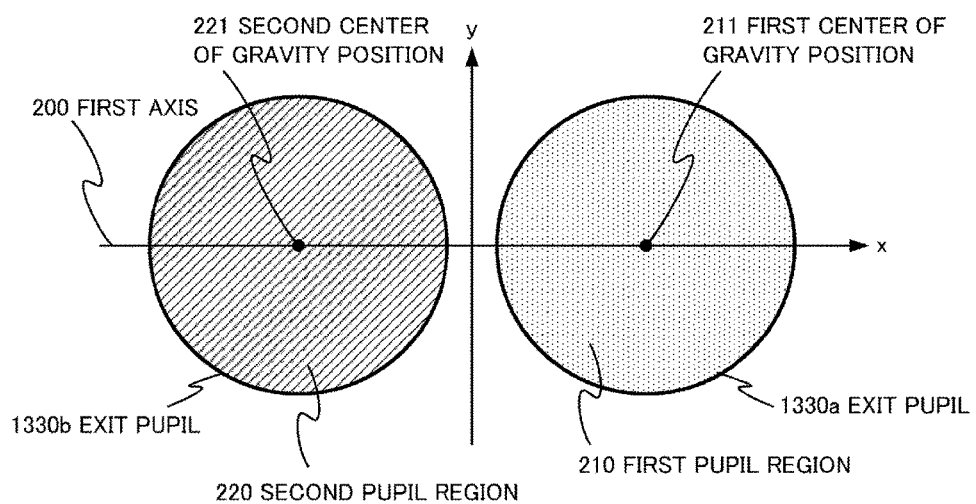

FIG. 15B is a diagram depicting the exit pupil 1330a of the first imaging optical system 1320a viewed from the intersection of the optical axis 1340a and the image sensor 1301a, and the exit pupil 1330b of the second imaging optical system 1320b viewed from the intersection of the optical axis 1340b and the image sensor 1301b.

The first pupil region 210 is included in the exit pupil 1330a, and the second pupil region 220 is included in the exit pupil 1330b. The center of gravity position 211 of the first pupil region 210 (first center of gravity position) and the center of gravity position 221 of the second pupil region 220 (second center of gravity position) are decentered (shifted) along the first axis 200.

Just like the digital camera 1300, the focusing distance and the distance confidence can be calculated in the imaging apparatus having a plurality of imaging optical systems and image sensors using the same method as the method shown in the above examples.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A distance calculation apparatus configured to calculate distance information based on a first image, which is generated based on luminous flux that passed through a first pupil region, and a second image, which is generated based on luminous flux that passed through a second pupil region, the distance calculation apparatus comprising:
    at least one processor operatively coupled to a memory serving as:
    (a) a distance calculation unit configured to calculate the distance information by comparing a local region of the first image and a local region of the second image; and
    (b) a confidence calculation unit configured to calculate confidence of the distance information based on a contrast evaluation value, which is a value indicating a magnitude of a contrast change amount in the local region of the first image, in the local region of the second image or in a local region of a composite image of the first image and the second image, and a noise amount estimation value, which is a value indicating an estimated amount of noise contained in the first image, the second image, or the composite image, is calculated based on one of pixel values of the local region of the first image, pixel values of the local region of the second image, and pixel values of the local region of the composite image of the first image and the second image.

2. The distance calculation apparatus according to claim 1, wherein the contrast evaluation value is a value based on correlation between the local region of the first image and the local region of the second image.

3. The distance calculation apparatus according to claim 1, wherein the confidence calculation unit calculates the noise amount estimation value such that the noise amount estimation value increases as the pixel values of the first image, the second image or the composite image are greater.

4. The distance calculation apparatus according to claim 1, wherein the noise amount estimation value N(x,y) at a pixel position (x,y) is calculated by the following expression:

$$N(x,y) = \sqrt[n]{A^n + (B \cdot I(x,y))^n}$$

where I(x,y) denotes a value based on a pixel value at the pixel position (x,y), A denotes a constant, B denotes a constant, and n denotes a degree of the contrast evaluation value.

5. The distance calculation apparatus according to claim 4, wherein I(x,y), which is the value based on the pixel value at the pixel position (x,y), is a mean value of the pixel values included in the local region of the first image or the local region of the second image, and used for calculating the distance information at the pixel position (x,y).

6. The distance calculation apparatus according to claim 1, wherein the noise amount estimation value N(x,y) at a pixel position (x,y) is calculated by the following expression:

$$N(x, y) = \max\left(A, (B \cdot I(x, y))^{\frac{n}{2}}\right)$$

where I(x,y) denotes a value based on a pixel value at the pixel position (x,y), A denotes a constant, B denotes a constant, and n denotes a degree of the contrast evaluation value.

7. The distance calculation apparatus according to claim 6, wherein I(x,y), which is the value based on the pixel value at the pixel position (x,y), is a mean value of the pixel values included in the local region of the first image or the local region of the second image, and used for calculating the distance information at the pixel position (x,y).

8. The distance calculation apparatus according to claim 1, wherein the confidence calculation unit is further configured to calculate the confidence of the distance information based on a ratio of the contrast evaluation value and the noise amount estimation value.

9. The distance calculation apparatus according to claim 1, wherein a center of gravity of the first pupil region and a center of gravity of the second pupil region is located at different positions along a first axis, and
wherein the contrast evaluation value is calculated based on a second value representing a plurality of first values indicating contrast change along the first axis on different positions along a second axis perpendicular to the first axis in the local region of the first image, in the local region of the second image or in the local region of the composite image of the first image and the second image.

10. The distance calculation apparatus according to claim 9, wherein the first values are at least one of (i) variances of pixel values of a pixel array along the first axis, (ii) differences between a maximum value and a minimum value of pixel values of a pixel array along the first axis, and (iii) sums or average values of absolute values of values generated by differentiating, along the first axis, pixel values of a pixel array along the first axis.

11. The distance calculation apparatus according to claim 9, wherein the second value is at least one of (i) a sum of the first values, (ii) an average of the first values, (iii) a median of the first values, (iv) and a mode of the first values.

12. A distance calculation method executed by a distance calculation apparatus configured to calculate distance information based on a first image, which is generated based on luminous flux that passed through a first pupil region, and a second image, which is generated based on luminous flux that passed through a second pupil region, the distance calculation method comprising the steps of:
calculating the distance information by comparing local regions of the first image and a local region of the second image; and
calculating confidence of the distance information based on a contrast evaluation value, which is a value indicating a magnitude of a contrast change amount in the local region of the first image, in the local region of the second image or in a local region of a composite image of the first image and the second image, and a noise amount estimation value which is a value indicating an estimated amount of noise contained in the first image, the second image, or the composite image, is calculated based on one of pixel values of the local region of the first image, pixel values of the local region of the second image, and pixel values of the local region of the composite image of the first image and the second image.

13. A non-transitory storage medium storing a program to cause a distance calculation apparatus, configured to calculate distance information based on a first image, which is generated based on luminous flux that passed through a first pupil region, and a second image, which is generated based on luminous flux that passed through a second pupil region, to execute the steps of:
calculating the distance information by comparing local regions of the first image and a local region of the second image; and
calculating confidence of the distance information based on a contrast evaluation value, which is a value indicating a magnitude of a contrast change amount in the local region of the first image, in the local region of the second image or in a local region of a composite image of the first image and the second image, and a noise amount estimation value, which is a value indicating an estimated amount of noise contained in the first image, the second image, or the composite image, is calculated based on one of pixel values of the local region of the first image, pixel values of the local region of the second image, and pixel values of the local region of the composite image of the first image and the second image.

* * * * *